United States Patent [19]
Brown

[11] Patent Number: 6,029,239
[45] Date of Patent: Feb. 22, 2000

[54] CONFIGURING A COMMUNICATIONS SYSTEM WITH A CONFIGURABLE DATA TRANSFER ARCHITECTURE

[75] Inventor: Glen W. Brown, Austin, Tex.

[73] Assignee: Advanced Micro Devices, Inc., Sunnyvale, Calif.

[21] Appl. No.: 08/980,580

[22] Filed: Dec. 1, 1997

[51] Int. Cl.[7] .................................................. G06F 15/00
[52] U.S. Cl. .................. 712/1; 712/27; 712/28; 712/29; 712/32; 712/37; 712/40; 370/331; 370/338
[58] Field of Search .................................... 712/1, 14, 32, 712/37, 35, 36, 27, 28, 29, 40; 370/331, 338

[56] References Cited

U.S. PATENT DOCUMENTS

| | | | |
|---|---|---|---|
| 5,250,940 | 10/1993 | Valentaten et al. | 345/189 |
| 5,315,235 | 5/1994 | Atherton et al. | 324/116 |
| 5,581,173 | 12/1996 | Yalla et al. | 323/257 |
| 5,631,651 | 5/1997 | Nichols et al. | 341/155 |
| 5,790,817 | 8/1998 | Asghar et al. | 710/129 |

*Primary Examiner*—Meng-Ai T. An
*Assistant Examiner*—Dzung C. Nguyen
*Attorney, Agent, or Firm*—Conley, Rose & Tayon; Jeffrey C. Hood

[57] ABSTRACT

A communications system utilizes an embedded Digital Signal Processor (DSP), a DSP interface and memory architecture, a micro-controller interface, a DSP operating system (OS), a data flow model, and an interface for hardware blocks. The design allows software to control much of the configuration of the architecture while using hardware to provide efficient data flow, signal processing, and memory access. In devices with embedded DSPs, memory access is often the bottleneck and is tightly coupled to the efficiency of the design. The platform architecture involves a method that allows the sharing of the DSP memory with other custom hardware blocks or the micro-controller. The DSP can operate at full millions-of-instructions-per-second (MIPS) while another function is transferring data to and from memory. This allows for an efficient use of the memory and for a partitioning of the DSP tasks between software and hardware.

18 Claims, 20 Drawing Sheets a block diagram of the memory architecture an example of a wireless, digital communications device an example of a wired, digital communications device a block diagram of the configurable architecture of the communications system Memory map for MCU - Access to MCU memory

|  | Start | End | Description | Alignment |
|---|---|---|---|---|
| segment 0 | 00000 | 0FFFF | 64Kx 8 MCU RAM and peripherals | byte |
| segment 1 | 10000 | 1FFFF | reserved (flash ?) |  |
| segment 2 | 20000 | 2FFFF | reserved (flash ?) |  |
| segment 3 | 30000 | 3FFFF | reserved (flash ?) |  |

Memory map for MCU - Access to baseband registers and DSP memory

|  | Start | End | Description | Alignment |
|---|---|---|---|---|
| segment 4 | 40000 | 43FFE | 4Kx24 DSP Program RAM Bank 0 | dword |
|  | 44000 | 47FFE | 4Kx24 DSP Program RAM Bank 1 | dword |
|  | 48000 | 4BFFE | 4Kx24 DSP Program RAM Bank 2 | dword |
|  | 4C000 | 4FFFE | 4Kx24 DSP Program RAM Bank 3 | dword |
| segment 5 | 50000 | 53FFD | 4Kx16 DSP Data RAM Bank 0 | dword |
|  | 54000 | 57FFD | 4Kx16 DSP Data RAM Bank 1 | dword |
|  | 58000 | 5BFFD | 4Kx16 DSP Data RAM Bank 2 | dword |
|  | 5C000 | 5FFFD | 4Kx16 DSP Data RAM Bank 3 | dword |
| segment 6 | 60000 | 63FFE | 4Kx24 DSP Program ROM Bank 0 | dword |
|  | 64000 | 67FFE | 4Kx24 DSP Program ROM Bank 1 | dword |
|  | 68000 | 6BFFE | 4Kx24 DSP Program ROM Bank 2 | dword |
|  | 6C000 | 6FFFE | 4Kx24 DSP Program ROM Bank 3 | dword |
| segment 7 | 70000 | 703FD | 256x16 DFP Registers | dword |
|  | 70400 | 77FFF | reserved |  |
|  | 78000 | 783FD | 256x16 Hardware Accelerators | dword |
|  | 78400 | 7FFFF | reserved |  | the memory map of the MCU

FIG. 4

Memory map for DFP

|  | Start | End | Description |
|---|---|---|---|
|  | 0000 | 0FFF | 4Kx24 DSP Program RAM Bank 0 |
|  | 1000 | 1FFF | 4Kx24 DSP Program RAM Bank 1 |
|  | 2000 | 2FFF | 4Kx24 DSP Program RAM Bank 2 |
|  | 3000 | 3FFF | 4Kx24 DSP Program RAM Bank 3 |
|  |  |  |  |
|  | 4000 | 4FFF | 4Kx16 DSP Data RAM Bank 0 |
|  | 5000 | 5FFF | 4Kx16 DSP Data RAM Bank 1 |
|  | 6000 | 6FFF | 4Kx16 DSP Data RAM Bank 2 |
|  | 7000 | 7FFF | 4Kx16 DSP Data RAM Bank 3 |
|  |  |  |  |
|  | 8000 | 8FFF | 4Kx24 DSP Program ROM Bank 0 |
|  | 9000 | 9FFF | 4Kx24 DSP Program ROM Bank 1 |
|  | A000 | AFFF | 4Kx24 DSP Program ROM Bank 2 |
|  | B000 | BFFF | 4Kx24 DSP Program ROM Bank 3 |
|  |  |  |  |
|  | C000 | C0FF | 256x16 DFP Registers |
|  | C100 | DFFF | reserved |
|  | E000 | E0FF | 256x16 Hardware Accelerators |
|  | E100 | FFFD | reserved |
|  | FFFE |  | MCU packet transfer |
|  | FFFF |  | indirect destination for data stream | the memory map of the DFP

FIG. 5

Memory map for DSP

|  | Start | End | Description |
|---|---|---|---|
|  | 0000 | 0FFF | 4Kx24 DSP Program RAM or ROM Bank 0 |
|  | 1000 | 1FFF | 4Kx24 DSP Program RAM or ROM Bank 1 |
|  | 2000 | 2FFF | 4Kx24 DSP Program RAM or ROM Bank 2 |
|  | 3000 | 3FFF | 4Kx24 DSP Program RAM or ROM Bank 3 |
|  |  |  |  |
|  | 0000 | 0FFF | 4Kx16 DSP Data RAM Bank 0 |
|  | 1000 | 1FFF | 4Kx16 DSP Data RAM Bank 1 |
|  | 2000 | 2FFF | 4Kx16 DSP Data RAM Bank 2 |
|  | 3000 | 3FCF | <4Kx16 DSP Data RAM Bank 3 |
|  | 3FD0 | 3FDF | 16x16 memory mapped DFP registers |
|  | 3FE0 | 3FFF | 32x16 memory mapped 21xx registers | the memory map of the DSP

FIG. 6 a block diagram of the configurable architecture of the communications system

| 2171 PIN NAME | IN-OUT-I/O | connection | function |
|---|---|---|---|
| ADDRESS[13:0] | O | none | BMA[12:0] for DFP memory addressing |
| DATA[23:0] | I/O | none | NB[23:0] for DFP to RAM |
| RESET_ | I | device pin | device reset |
| IRQ2_ | I | interrupt reg in DFP | same as 2171 |
| BR_ | I | to DFP | DFP request for RAM |
| BG_ | O | to DFP | DSP grant to DFP |
| BGH_ | O | to DFP | DSP interface to DFP |
| PMS_ | O | none | no external memory |
| DMS_ | O | none | no external memory |
| BMS_ | O | none | no external memory |
| RD_ | O | none | no external memory |
| WR_ | O | none | no external memory |
| MMAP | I | none | fixed @ MMAP=1 |
| CLKIN, XTAL | I | none | bus clock used as clock in to digital clock block |
| CLKIN, XTAL | I | none | to clk gen block |
| CLKOUT | O | device pin | same as 2171(inst rate clock out) |
| HSEL_ | I | none | DFP is the interface |
| HACK_ | O | none | DFP is the interface |
| HSIZE | I | none | DFP is the interface |
| BMODE | I | none | fixed at BMODE=0 |
| HMD0 | I | none | DFP is the interface |
| HMD1 | I | none | DFP is the interface |
| HRD_ / HRW | I | none | DFP is the interface |
| HWR_ / HDS_ | I | none | DFP is the interface |
| HD[15-0] / HAD[15-0] | I/O | none | DFP is the interface |
| HA2 / ALE | I | none | DFP is the interface |
| HA1-0 | I | none | DFP is the interface |
| unused | I | | |
| TFS0 | O | device pin | same as 2171 |
| RFS0 | I | device pin | same as 2171 |
| DT0 | O | device pin | same as 2171 |
| DR0 | I | device pin | same as 2171 |
| SCLK0 | I/O | device pin | same as 2171 |
| TFS1 / IRQ1_ | I/O | device pin | IRQ1_ can be muxed to IRQREG |
| RFS1 / IRQ0_ | I/O | device pin | IRQ0_ can be muxed to IRQREG |
| RFS1 | O | device pin | same as 2171 |
| SCLK1 | I/O | device pin | same as 2171 |
| DT1/FO | O | device pin | F0 is readable in IRQREG |
| DR1/FI | I | device pin | DFP is input from BI ONLY. F1 is readable in IRQREG |
| FL2 | O | device pin | readable by IRQREG |
| FL1 | O | device pin | readable by IRQREG |
| FL0 | O | device pin | readable by IRQREG |
| PWD_ | I | device pin | device pwr down |
| PWDACK | O | device pin | device pwr down ack | the pin use of the DSP 2171 in the system

FIG. 9

| | | | |
|---|---|---|---|
| Program Memory | 1st block | 0x00000 | BMA[14:0] = 0x0000 |
| RAM | | 0x00FFF | BMA[14:0] = 0x0FFF |
| | 2nd block | 0x01000 | BMA[14:0] = 0x1000 |
| | | 0x01FFF | BMA[14:0] = 0x1FFF |
| | 3rd block | 0x02000 | BMA[14:0] = 0x2000 |
| | | 0x02FFF | BMA[14:0] = 0x2FFF |
| | 4th block | 0x03000 | BMA[14:0] = 0x3000 |
| | | 0x03FFF | BMA[14:0] = 0x3FFF |
| Data Memory | 1st block | 0x00000 | BMA[14:0] = 0x4000 |
| | | 0x00FFF | BMA[14:0] = 0x4FFF |
| | 2nd block | 0x01000 | BMA[14:0] = 0x5000 |
| | | 0x01FFF | BMA[14:0] = 0x5FFF |
| | 3rd block | 0x02000 | BMA[14:0] = 0x6000 |
| | | 0x02FFF | BMA[14:0] = 0x6FFF |
| | 4th block | 0x03000 | BMA[14:0] = 0x7000 |
| | | 0x03FFF | BMA[14:0] = 0x7FFF |
| OPTIONAL: | | | |
| Program Memory | 1st block | 0x00000 | BMA[14:0] = 0x8000 |
| ROM | | 0x00FFF | BMA[14:0] = 0x8FFF |
| | 2nd block | 0x01000 | BMA[14:0] = 0x9000 |
| | | 0x01FFF | BMA[14:0] = 0x9FFF |
| | 3rd block | 0x02000 | BMA[14:0] = 0xA000 |
| | | 0x02FFF | BMA[14:0] = 0xAFFF |
| | 4th block | x03000 | BMA[14:0] = 0xB000 |
| | | x03FFF | BMA[14:0] = 0xBFFF | the memory mapping of the DSP's address to the generated address

FIG. 11 a block diagram of the data flow processor a flow chart of the data stream status the DFP-DSP interface for IRQ0 & IRQ1 the DFP-RAM interface with single access R/W the DFP-RAM interface with double access R/W

| DPF Address Offset | DSP Data Memory Address Offset | Description | Mnemonic | Register Size (bits) |
|---|---|---|---|---|
| 0 | - | interrupt register | IRQREG | 16 |
| 1 | - | DFP control register | CTLREG | 16 |
| 2 | 0 | inactive stream # | INASTRREG | 5 |
| 3 | - | test register | TSTREG | 16 |
| 4 | - | MCU data stream buffer | MCUBUFREG | 16 |
| 5 | - | stream # for MCU packet write (MCU packet request) | MBUFSTRREG | 5 |
| 6 | - | stream # for MCU packet read (DFP packet request) | MINASTRREG | 5 |
| 7 | - | debug control | DBCTL[15:0] | 16 |
| 8 | - | break point field 1 control | BPF1[7:0] | 8 |
| 9 | - | break point field 1 address | BPFA1[15:0] | 16 |
| A | - | break point field 2 control | BPF2[7:0] | 8 |
| B | - | break point field 2 address | BPFA2[15:0] | 16 |
| C | - | break point field 3 control | BPF3[7:0] | 8 |
| D | - | break point field 3 address | BPFA3[15:0] | 16 |
| 10 | - | streams[15:0] transfer status | SSTATREG[15:0] | 16 |
| 11 | - | streams[31:16] transfer status | SSTATREG[31:16] | 16 |
| 14 | - | stream 1 control | SCTL1 | 16 |
| 15 | 1 | stream 1 buffer size | SSZ1 | 16 |
| 16 | 2 | stream 1 source address | SA1 | 16 |
| 17 | 2 | stream 1 destination address | DA1 | 16 |
| 18-8B | | stream registers for streams 2-30 | SCTL2 - DA30 | 16 |
| 8C | - | stream 31 control | SCTL31 | 16 |
| 8D | 1 | stream 31 buffer size | SSZ31 | 16 |
| 8E | 2 | stream 31 source address | SA31 | 16 |
| 8F | 2 | stream 31 destination address | DA31 | 16 |
| 90-BF | | reserved | | 16 |
| C0-DF | - | HW request stream # | HRQ<0-31>REG | 5 | the DFP registers

FIG. 17 the HW Accelerator-DFP interface the DFP-SFT interface

Flow Chart for Interrupt 2 Routine

CONFIGURING A COMMUNICATIONS SYSTEM WITH A CONFIGURABLE DATA TRANSFER ARCHITECTURE

FIELD OF THE INVENTION

The present invention relates to communications systems for wired and wireless environments, and more particularly to a communications architecture for wired and wireless communication environments which is configurable according to a plurality of different possible digital communication standards.

DESCRIPTION OF THE RELATED ART

Wireless and wired information networks are currently experiencing enormous growth throughout the world. Examples of wireless information networks include cordless telephones, personal communications services (PCS), cellular telephones, paging systems, mobile data networks, and mobile satellite systems. Examples of wired information networks include the various types of computer modems. In conjunction with the growth in wireless information networks, communications networks are currently undergoing a transition from analog-based technology to digital technology. Wireless and wired information networks will benefit greatly from digital implementations, including better performance, increased capacity, and a wider offering of services.

Various types of wireless and wired information networks exist, including networks designed for voice and data. In general, different networks exist for voice and data because of the different and often contradictory requirements of voice service and data service. Thus, although digitized voice, video and data are all "binary digits" (bits), each service has different requirements in a digital network. For example, wireless voice data services are required to be comparable to a user's expectation of telephone voice quality in the public switched telephone network (PSTN). Thus, packetized voice service in a wireless network must minimize time delays in transmission. In general, in a voice transmission, inter-packet delays in excess of 100 ms are noticeable and annoying to the listener. In contrast, in a data services network, time delays are generally irrelevant to the user. Also, packetized voice service can tolerate packet loss rates on the order of $10^{-2}$, or bit error rates of the same order, without a noticeable degradation in service quality. In contrast, data services require a much lower error rate, and loss of data packets is generally unacceptable. Voice conversations also typically generate Megabytes of digitized information and last at least several minutes, whereas data transfers typically involve less data and are shorter in length.

Thus, wireless and wired information networks typically involve either voice-driven applications such as digital cellular, PCS, cordless telephones, and wireless PBX, or data-driven networks such as wireless LANs and mobile data networks. For voice applications, digital cellular systems are designed to support mobile users roaming over wide geographic areas, whereas PCS, cordless telephones and wireless PBX systems are designed for relatively smaller geographic areas. For data applications, mobile data networks operate a relatively low data rates over urban radio channels, whereas wireless LANs are typically designed to support a limited number of users in a well-defined local area.

Cellular mobile telephone service is one of the most rapidly growing segments of the wireless communications industry. As mentioned above, digital cellular system is designed to support mobile users roaming over wide geographic areas, and thus coverage is provided by an arrangement of cells with a cell size typically 0.5 to 5 miles in diameter. There are currently several digital cellular standards initiatives in the United States, Europe, and Japan, including GSM (Groupe Special Mobile), IS-54, Japanese Digital Cellular (JDC), and Code Division Multiple Access (CDMA). Thus, current digital cellular telephone architectures are required to accommodate a plurality of different digital communication standards. Due to the explosive fragmentation of the digital communications standards, a system design method and baseline architecture would be desirable that could accelerate development and decrease the product-to-market time.

Current digital cellular telephone architectures generally include a different integrated circuit chip set, particularly in the baseband section, for accommodating each of these digital standards. Each of these different IC chipsets for performing different digital standards is generally only available from a few select companies, thus limiting the amount of product differentiation between manufacturers.

The use of different integrated circuits for each of the digital standards also adversely effects the telephone manufacturing process. As noted above, different market segments generally utilize different digital standards. For example, Europe is primarily based on the GSM standard, whereas the U.S. is primarily based on the IS54 standard. Therefore, for a company to participate in each of these various market segments for cellular telephones, the company is required to maintain multiple production flows, resources, reliability testing, packaging, port assembly and testing requirements for each of the digital standards that are supported. This necessarily leads to high manufacturing costs, which increases the cost of the overall system.

Therefore, an improved configurable architecture for digital communications applications is desired. More particularly, a new baseband architecture for digital communications is desired which provides reduced power consumption and more efficiency in executing the baseband operations of various digital communication standards. A new baseband architecture for digital communications is further desired which is easily configurable between different digital communications standards, thus simplifying the manufacturing process.

SUMMARY OF THE INVENTION

The present invention comprises an improved configurable architecture for digital communications. The new baseband architecture provides an efficient way to execute communication functions using various digital communications standards. In addition, the baseband architecture is easily configurable between different digital communications standards.

The configurable data transfer architecture communications system comprises a data flow processor (DFP), a micro-controller unit (MCU) coupled to the DFP, a digital signal processor (DSP) coupled to the DFP, and a memory coupled to the DFP and to the DSP. The MCU controls operations in the communications system, the DSP performs digital signal processing functions and executive functions in the communications system, and the memory stores data used by the DSP and the MCU. The DFP selectively allows access to the memory by the MCU.

The DFP provides an interface between the MCU, the DSP, and the memory. The MCU and the DSP are operable to communicate with each other and the memory through the DFP which is programmable to perform data transfers between two or more of the MCU, the DSP, and the memory. The MCU is operable to program the DFP to perform data transfers between two or more of the MCU, the DSP, and the memory. In addition, the MCU is operable to transfer a task list to the memory which comprises tasks to be executed by the DSP. The DSP executes the tasks in the task list and the DFP performs data transfers to perform communication functions in the communications system. The MCU programs the DFP to perform data transfers to aid in accomplishing the tasks in the task list.

The memory is directly accessible by the DFP and the DSP through a memory interface, but the MCU accesses the memory through the DFP. The memory can be accessed by a plurality of transfer paths coupled between the memory interface and one of the memory segments. Each of the transfer paths provides an independent data transfer path between the memory interface and a respective memory segment. The DSP and the DFP are operable to simultaneously access different memory segments through the memory interface. Each of the DSP and the DFP are operable to select different ones of the transfer paths for simultaneously connecting to different memory segments.

In one embodiment, the DFP is operable to provide memory segment access information to the DSP indicating at least one segment which is to be accessed or released by the DFP. The DSP receives the memory segment access information and operates to avoid segments which are being accessed by the DFP as indicated by the memory segment access information. In another embodiment, the DSP is operable to provide memory segment access information to the DFP indicating at least one segment which is to be accessed or released by the DSP. The DFP receives the memory segment access information and operates to avoid segments which are being accessed by the DSP as indicated by the memory segment access information.

The DFP comprises a stream processor and programmable registers coupled to the stream processor. The stream processor manages multiple, simultaneous data transfers between two or more of the MCU, the DSP, and the memory through the DFP. The programmable registers are programmable to control operation of the stream processor. The MCU is operable to write data to the programmable registers to program the stream processor. The data written to the programmable registers includes information indicating the priority of each of said data streams and the amount of data to be transferred for each of the data streams.

The stream processor is operable to access data comprised in the programmable registers and in response configure data streams between a source and a destination. The stream processor is operable to determine when to execute the data streams. The stream processor includes at least one buffer for temporarily storing data transferred between the source and the destination. The stream processor determines an ordering of transfers based on buffer availability. The DFP operates to perform the data transfers without further intervention from the MCU.

In one embodiment, the communications system further comprises a slave DSP coupled to the DFP. The slave DSP is a slave processor to the DSP and is controlled by the DSP. In another embodiment, the communications system further comprises a second DSP coupled to the DFP. The MCU is operable to transfer a second task list to the second DSP with a second plurality of tasks for the second DSP to perform.

In another embodiment, the communications system further comprises a first memory bus and second memory bus. The first memory bus couples the memory to the DFP and the second memory bus couples the memory to the DSP.

In another embodiment, the communications system further comprises one or more hardware accelerator units coupled to the DFP. The hardware accelerator units access the memory through the DFP and are operable to perform at least a portion of one or more of the tasks in the task list. The hardware accelerator units may comprise a dedicated input/output unit or a dedicated signal processing unit.

Broadly speaking, the present invention comprises an architecture that involves an embedded Digital Signal Processor (DSP), a DSP interface and memory architecture, a micro-controller interface, a DSP operating system (OS), a data flow model, and an interface for hardware blocks. This design allows software to control much on the configuration of the architecture while using hardware to provide efficient data flow, signal processing, and memory access. In devices with embedded DSPs, memory access is often the bottleneck and is tightly coupled to the efficiency of the design. The platform architecture involves a method that allows the sharing of DSP memory with other custom hardware blocks or the micro-controller. The DSP can operate at full millions-of-instructions-per-second (MIPS) while another function is transferring data to and from memory. This allows for an efficient use of memory and for a partitioning of the DSP tasks between software and hardware.

The architecture involves an operating system and data protocol that allows tasks to be efficiently partitioned and scheduled. The platform operating system is part software and part hardware with the two parts working together. Managing the data flow is done in hardware by the data flow processor (DFP) to support the software. The operating system, running on the DSP and on the micro-controller unit (MCU) has been designed to allow scheduling to be flexible. Many system implementations have tasks efficiently scheduled in a static manner. This often involves each task beginning at a specific point in time with the total number of clock cycles for each task known. However, when a task changes, many details in firmware or hardware must be reworked to accommodate the change. The tight coupling of events often ripples these changes throughout the system. Dynamic scheduling is at the other end of the spectrum with a high cost for overhead and development. The platform architecture allows programmable data driven scheduling. The list of tasks (algorithms, data movement, and some control functions) can be programmed in software. The software can easily handle changes during development and optimization of resources as the hardware and software implementations become final. The architecture can handle applications that involve distributed, concurrent, and data driven processes.

System Hierarchy

The platform involves a software and hardware definition to implement a system architecture. The software running on the MCU controls the overall operation. The platform is programmed by the MCU during setup. The setup includes several functions such as providing task scheduling to the DSP executive routine, programming the DFP registers for data flow, and programming the hardware blocks. The executive routine running on the DSP controls the tasks running on the DSP from a task list provided by the MCU. The task list may involve controlling hardware blocks to off-load the DSP. The DFP functions as a key part of the platform and serves as a common hardware interface between blocks. The DFP also functions as the main interface to the DSP and the DSP memory. The DFP also contains programmable control for managing multiple simultaneous data flow. The DFP does not provide control to the platform.

Software

The platform is designed to optimize each of the main functions of the system. The overall control is in the software of the MCU. This control is used to setup the platform and to make changes to the tasks during operation. The setup involves the scheduling of tasks which is done by writing a task list to the DSP executive software. During operation, the MCU can process data and execute higher level protocol tasks while the DSP executive software executes the task list independent from the MCU. The MCU will need to make changes to the task list in the DSP as necessary. Programmable hardware in the DFP is used for data flow and block interface. The DFP block determines how data is transferred, not when or where. The MCU programs the DFP for source and destination addresses for repetitive data flows for all tasks, referred to as data streams. The MCU programs data streams prior to real time operation. The DFP and the DSP executive routine then function in real time to efficiently execute data flow by allowing the platform blocks to operate with a minimum of real time control from the MCU for routine or repetitive functions.

Hardware

The DSP memory can be shared by the MCU or the hardware blocks. In this architecture, sharing refers to the simultaneous access by the DSP and the DFP of different segments in a partitioned memory. This allows other platform blocks to access data buffers in DSP memory eliminating the duplication of buffer space. While much of the control of the platform is in software, the processing of data streams by the DFP is in hardware. This allows the hardware to handle data flow more efficiently than interrupts and software routines. The DFP manages the simultaneous flow of data between many source and destination addresses. The DFP is generally programmed for many of these repetitive data streams ahead of when they are needed and transfers them, in packet form, when requested by the tasks. This data flow provides a very efficient means of interfacing to pipelined algorithms that are scheduled on a data driven basis.

The DFP contains a common interface and protocol for all the hardware accelerators. Hardware blocks can be added or deleted without changing the DFP. The DFP is the bus master to the DSP memory and the hardware accelerator bus. While the hardware blocks are slaves on their bus to simplify the design, they control their own input and output data flow through dedicated request signals.

The platform contains a model of a timer. The hardware timer can be programmed by the MCU to perform an address/data read by the DFP on a count of the timer. The address/data read could be used for any data driven function such as initiation of a DSP task or a timed serial data transfer. As in other system control functions mentioned, the programming of the function is non-real-time from a central control (MCU) while only the execution is real-time.

BRIEF DESCRIPTION OF THE DRAWINGS

FIG. 4 shows the memory map of the MCU;

FIG. 5 shows the memory map of the DFP;

FIG. 6 shows the memory map of the DSP;

FIG. 9 shows the pin use of the DSP 2171 in the system;

FIG. 11 shows the memory mapping of the DSP's address to the generated address;

FIG. 17 shows the DFP registers;

DETAILED DESCRIPTION OF THE PREFERRED EMBODIMENT

Figure 1:
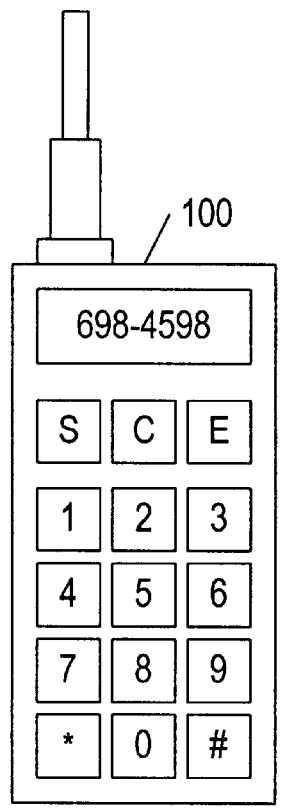
FIG. 1 shows an example of a wireless, digital communications device.

In one embodiment, the improved configurable architecture of the present invention is used in the wireless communications device shown in FIG. 1. Wireless communications device 100 is a cordless phone using the ADPCM (G.726) standard for speech coding. Alternatively, communications device 100 is a digital cellular device with the Linear Predictive Coding (LPC) standard for speech coding.

Figure 2:
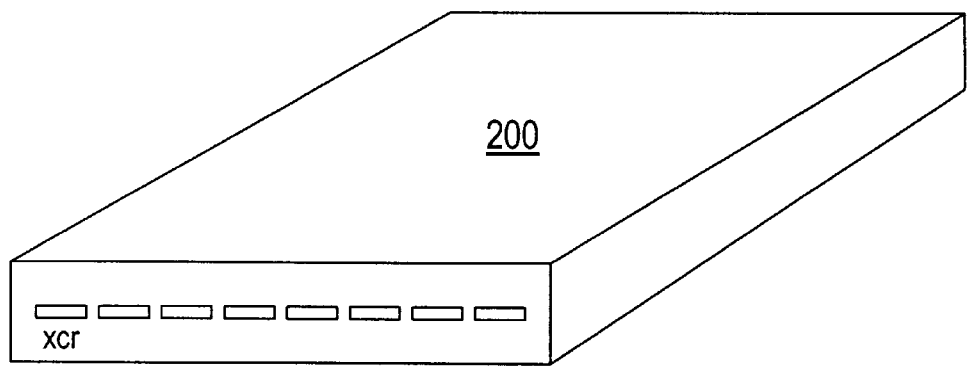
FIG. 2 shows an example of a wired, digital communications device.

In another embodiment, the improved configurable architecture of the present invention is used in the wired communications device shown in FIG. 2. Wired communications device 200 is a modem for transferring data between two devices physically connected by a wire.

Figure 3:
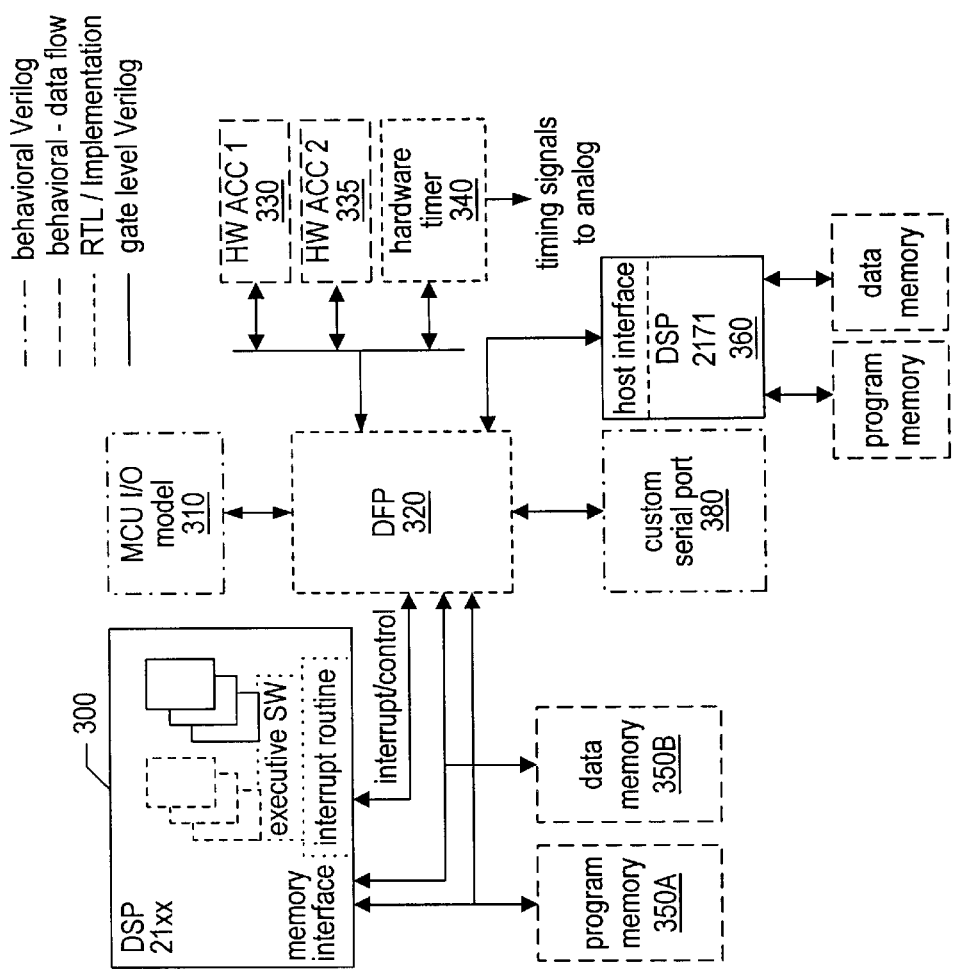
FIG. 3 shows a block diagram of the configurable architecture of the communications system.

The basic blocks of the improved configurable architecture are shown in FIG. 3. DFP 320 is in the center of the architecture. Coupled to DFP 320 are DSP 300, memory 350A and 350B, MCU 310, custom serial port 380, hardware accelerator blocks 330 and 335, hardware timer 340, and second DSP 360.

Digital Signal Processor (DSP)

In a preferred embodiment, DSP 300 comprises an ADI 2171 DSP. The ADI 2171 DSP 300 and memory bus architecture have been modified to allow sharing of DSP memory 350 with the rest of the system while minimizing the impact on DSP MIPS. DSP 300 does not contain the 2171's Host Interface Port. The interface to DSP 300 memory 350 by platform blocks other than DSP 300 is done by the Data Flow Processor (DFP) 320. DSP 300 contains two software functions that are important to the architecture's operation: the interrupt and the executive routines. The interrupt routine handles the interface to DSP 300 from DFP 320 and passes control data along to the executive routine. The executive code is DSP's 300 operating system that manages all functions outside each of the specific signal processing code blocks. This includes temporary data buffers in DSP 300 memory, sending and receiving commands to the rest of the chip, and execution of the task list as programmed by MCU 310. MCU 310 is assumed to execute protocol and some signal processing.

Micro-Controller Unit (MCU)

MCU's 320 I/O is a behavioral model that provides read/write functions and data transfers that come from the code running on MCU 320. MCU 310 model will be used to program hardware 330 and DSP 300 for each functional mode and for interfacing with DSP 300 software. MCU 310 model will be used to write to registers to program DFP 320. This will setup data transfers between blocks that will occur as needed by the scheduled functional tasks. MCU 310 will program hardware timing block 340 to initiate the scheduling of algorithms and data transfers that must occur at specific times within a frame.

Data Flow Processor (DFP)

DFP's 320 purpose is to transfer data between all the blocks and to master the buses to hardware blocks 330 and to DSP 300 memory bus. DSP's 300 parallel port interface has been replaced by the ability to share blocks of memory under direct access by DFP 320. Therefore, one of the main functions of DFP 320 is to interface with DSP 300 to transfer all data and commands through access to DSP's 300 shared memory 350. DFP 320 contains hardware dedicated to interfacing with DSP's 300 interrupt routine and for memory access. Data is transferred between other blocks in the platform and DSP's 300 memory via DFP 320. DFP 320 is designed to manage continuous data flow through data streams. Data streams, defined below, allow data transfers to be programmed and occur as the tasks are scheduled with minimum software interrupts. Data streams are programmed by MCU 310.

Hardware Timer

Timer block 340 is a behavioral model containing a timer and a controller for initiating scheduled events in hardware. The protocol software running on MCU 310 controls the modes and timing information for hardware 330. MCU 310 protocol software does not directly control the timing of events within a frame. MCU 310 software will program timer block 340 to initiate any type of task by providing a count to the timer. Block 340 can be programmed for many tasks at once and will generate a data read cycle by DFP 320 as each programmed count occurs. The timer initiates events such as software algorithms in DSP 300, triggering the execution of hardware blocks 330, and triggering timing critical data transfers. The timer will be programmable by MCU code to allow flexibility in scheduling. It will schedule events, manage repeating events, and reuse memory registers for expired events.

Hardware Data Processing Functions

The platform development will contain a behavioral register and bus model for hardware blocks 330 and 335. These blocks may operate as stand alone functions or may be used to accelerate a DSP software function. In FIG. 3, they are referred to as hardware accelerators (HW ACC). The platform will allow blocks 330 to use DSP's 300 memory as input and output buffers. The shared memory architecture and DFP 320 allow DSP 300 to execute while a hardware accelerator runs using data buffers in DSP memory 350B. Each hardware accelerator has control of the data rate from DSP data memory 350B. How the accelerator uses DSP's 300 data memory is flexible. It can be on a block or word basis keeping the register count low in the accelerator.

The design of hardware blocks 330 is completely flexible. A simple common interface to DFP 320 is used for all hardware blocks. Hardware blocks 330 can contain addressable registers for programming operating modes and functions. Second DSP 360 could be used as slave processor to main DSP 300. A second DSP would require program memory and some amount of data memory for processing.

Serial/Parallel Port(s)

Custom serial port 380 would be used to transfer data to and from the IF and radio functions. Serial port 380 could be used as a source or destination of a continuous data flow to DSP memory 350. DFP 320 could be programmed to handle the data stream and notify DSP 300 when a data buffer has been filled or emptied. The port could be addressed by MCU 310 for read or writes through DFP 320.

The platform refers to a definition of both hardware and software functions. The following definitions are used:

DSP Memory Buffer—DSP 300 will allocate a continuous address space in program memory 350A or data memory 350B for other functional blocks to write to or read from via DFP 320. This may also be referred to as 'program memory buffer' or 'data memory buffer'.

DSP Memory Start Address—The first address in DSP data memory 350A or program memory 350B of a contiguous memory space to be used as a read or write buffer.

DSP Memory Buffer Size—The size of data, in DSP memory words, to be transferred using a programmed data stream. The data buffer may be as little as one word and as large as 16K words. The size is programmed in words. The data stream will begin when it is programmed and continue until DSP's 300 Memory Buffer Size is reached.

Data Stream—The unidirectional flow of data that is setup by MCU's 310 software. The source or destination may involve any address in DFP's 320 address space and any DSP RAM memory address (except memory mapped space). Data is transferred from source address to destination address in packets. Many data streams can be programmed and transmit data simultaneously using common hardware.

DSP Interrupt—An interrupt of DSP 300 using the IRQ2, IRQ1, or IRQ0 pins on DSP 300. These can be controlled by DFP 320. The IRQ2 interrupt routine on DSP 300 is used as the interface to the rest of the system and is controlled by DFP 320.

System Interrupt—DFP 320 can generate a system level interrupt of MCU 310.

Data Stream off—the ON bit in the data stream's control register, STR<1-31>CTL is zero. The memory management block will set the status bit in the stream status register, SSTATREG, when a stream is referenced that is off.

Data Stream on—the ON bit in the data stream's control register, STR<1-31>CTL is one. This should be set when some, but not necessarily all, of the control information has been programmed for the stream. Typically a stream will be ON when setup but not programmed for the source or destination buffer addresses. It is necessary for a stream number to be ON before it is active. The state of each data stream will be considered ON, ACTIVE, INACTIVE, or OFF by DFP 320.

When the data STREAM ON bit for a DFP address changes from 0 to 1 the stream is turned on. When this occurs, DFP 320 expects the control registers for the particular data stream have been programmed.

Data Stream active—the stream is said to be active when the ON bit in the data stream's control register, STR<1-31>CTL is one and DFP 320 has a valid source and destination addresses.

Data Stream Inactive—the ON bit in the data stream's control register, STR<131>CTL is one and the control registers for the data stream have been programmed but DFP 320 control does not have a valid source or destination buffer. When a stream's status changes from active to inactive, interrupts to the host system (MCU 310) or DSP 300 are possible, depending on the programming of the stream's control register. This is the state of a stream when it is temporarily not being used. A stream would change between active and inactive, based on the availability of buffer space, to control the data flow in the system.

Software/Hardware Interface

There are two software-to-hardware interfaces that need to be defined for data modem systems where at least a portion of signal processing is performed in software on a DSP. One is micro-controller (MCU 310) to hardware interface (including DSP 300). The second is the interface to DSP 300 software. DSP 300 software functions need to be defined for the interface to the hardware portion of the platform as well as for MCU 310 to DSP 300 interface.

Controller Software to Baseband Hardware Interface

The protocol software running on the controller has to be able to determine the baseband operating modes as well as transfer data between the signal processing functions and the protocol. MCU's 310 software can not control any functions that are timing critical in the baseband hardware. For a remote controller, this is a must due to bus latencies. The interface for the software definition would be essentially the same for MCU 310 on or off chip.

One of the interfaces between both MCU 320 and DSP 300 software and the platform hardware is in implementing data flow via data streams. The concept of data streams has been defined above. DFP 320 hardware manages the data streams that transmit data between the software in MCU 310 and DSP 300. The data streams are determined by MCU 310 software programming the hardware for each source/destination pair of addresses for data flow. Data is then transferred when available by DFP 320. This allows the data flow of the system to be completely determined by software.

MCU 310 software must then program the hardware for the data streams that will be needed for basic block to block communication as well as those needed for the upcoming signal processing operations to be performed. This is done by writes to DFP 320 registers. Details are given later in this description.

Address Space

MCU's 310 behavioral model in the platform uses a 32 bit bus and operation is not specific to a micro-controller. The hardware interface to M1U 320 is straightforward when on chip DFP 320 interfaces to the M1U's 320 parallel bus. MCU 310 is the master. MCU 310 can address its own memory, DSP's 300 memory, and registers in the platform hardware using the memory addresses in FIG. 4. MCU's 310 address space uses 19 bits. DFP 320 uses a 16 bit address space. DFP 320 maps MCU 310's 310 ADDRESS[17:2] to DFP 320's 320 ADDRESS[15:0]. The platform hardware registers and DSP's 300 memory are part of the 16 bit DFP space, see FIG. 5. DSP 300 uses a 14 bit address space to address the 16K words of program or 16K words of data memory. The selection of program or data memory is done by DSP's 300 bus interface. The memory map for DSP 300 is given in FIG. 6.

MCU Setup of DSP

One of the first tasks of the controller is to setup DSP 300 for the task list. MCU 310 will program DFP 320 for a data stream to DSP 300 to be used for commands. MCU 310 will send data commands on each task to this data stream and DFP 320 will write the data into DSP's 300 data memory and interrupt DSP 300. The interrupt routine and executive routines will store the information on each task. Examples of information sent to DSP's 300 executive routine are:

task ID (referencing an algorithm), ID of the previous and next tasks data stream number(s) to be used as input(s) & output(s) for each task items needed to initiate each task ID (data buffer #, tasks IDs that must complete)

memory management: when data buffers & data streams for each task should be allocated The task lists for the main operating modes will generally be a list stored in memory and MCU 310 will down load the list. During operation, MCU 310 can make changes to the task list be sending commands to change the effected tasks. Each of the tasks running from DSP's 300 EXEC software requires corresponding data streams to be programmed in DFP 320.

MCU Setup of DFP

DFP 320 is programmable for the specifics of each data stream. MCU 310 must program the data streams by writing to the stream control registers within DFP 320. MCU 310 programs as many data streams as necessary to support the task schedule. Examples of information written to the stream control registers are the source and destination address, the packet size for individual data transfers, and the buffer size. The programming of DFP 320 is done up front by MCU 310. DFP 320 maintains many data streams simultaneously, for the platform model it is 32. For data flowing between two addresses throughout the operation of the system, MCU 310 will not be involved further. As functional modes change, MCU 310 may turn off some data streams in order to use the resources in DFP 320 for others. The data stream needs of the platform will be determined during the design and MCU 310 will need to manage the operating modes, task schedule, and the data streams that support the programmed tasks. Setup and changes to DFP 320 should be not be a real time function (cycle accurate) for MCU 310.

Figure 7:
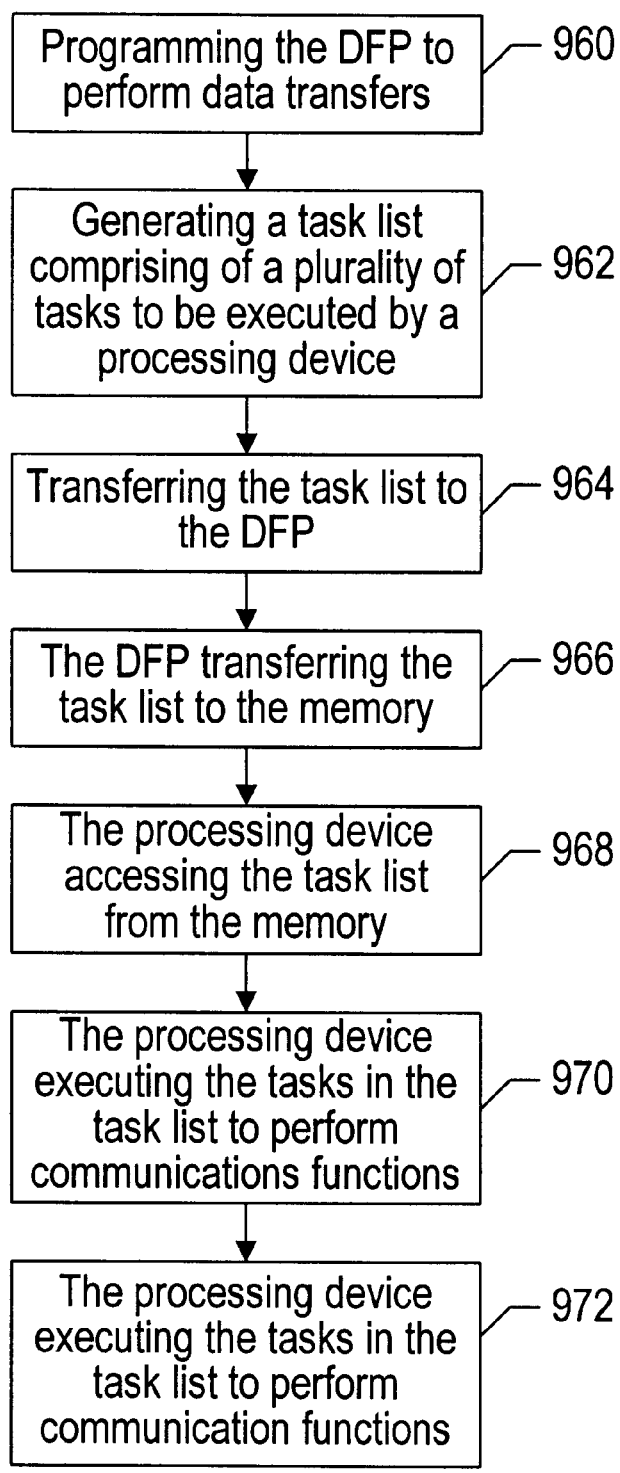

The flowchart shown in FIG. 7 describes how the communications system is configured. In step 960, the MCU programs the DFP to perform data transfers. The MCU provides minimum control to the system after the initial setup. The MCU can change the initial programming if required by the system.

In step 962, the MCU generates a task list that comprises a plurality of tasks to be executed by the DSP. The task list is transferred to the DFP, in step 964, which transfers the task list to the memory in step 966. The DFP interrupts the DSP to alert the DSP to the presence of the task list in the memory.

In step 968, the DSP accesses the task list from the memory in response to the DFP's interruption, and, in step 970, the DSP executes the task list to perform communication functions. Executing the task list comprises the DSP configuring the DFP to execute one or more data streams, the DSP determining a buffer allocation in the memory, and communicating to the DFP that the buffer in the memory is available or full. In step 972, the DFP performs the data transfers in response to the DSP communicating to the DFP that the buffer in the memory is available or full.

In one embodiment, the DSP distributes at least a portion of one or more of the tasks to one or more auxiliary DSPs through the DFP. To accomplish this, the DSP writes a second task list to the memory, the DFP reads the second task list from the memory, and the DFP transfers the second task list to the one or more auxiliary DSPs. The one or more auxiliary DSPs execute the tasks on the second task list.

MCU Setup of Timer

The timer block can be used to initiate a transmit or receive algorithm sequence or to time the transfer of data from one function to another. The timer provides a counter triggered output to other blocks in the platform by a direct signal or W/R cycle through DFP 320. MCU 310 programs the hardware timing block by writing the value of the counter to the timer's registers along with an address and data. When the timer count is met, the timer control will initiate a DFP transfer of the address/data. The timer block could be used to frame synchronize MCU 310 and analog functions directly. The timer control can handle many programmed events at once.

DSP Software to Baseband Hardware Interface

There are two functional blocks of DSP code that provide operating system functions. These are the interrupt routine and the executive routine (EXEC). These blocks of code are separate from the signal processing algorithms. The interrupt routine should be kept small, about 100 words. The interrupt routine interfaces with DFP 320 for memory allocation for data buffers, status, and data stream control. The executive routine is the software interface between DSP's 300 code and the rest of the chip. Some of the main functions of DSP's 300 OS software are listed below. The details are given in the part of the description on Software OS Functions.

Interrupt Routine functions

1. Hardware handshake between DFP 320 and DSP 300
    1.1. DFP 320 and DSP's executive routine work together to manage the data streams. The data stream information and status information is transferred through DFP addresses mapped to DSP's 300 data memory space. The interrupt routine and DFP use the flag pins to obtain a complete handshaking so common registers are not over written.
2. Data stream buffer management
    2.1. When a data stream becomes inactive because DSP's 300 data buffer is full (or has been emptied) DFP 320 will attempt to get another buffer from DSP's 300 OS to allow double buffering and a continuous data flow. The interrupt routine will provide the new buffer address if it has been allocated by DSP's 300 EXEC.
    2.2. The interrupt routine will perform some checks against invalid data stream commands such as referencing a stream number that is not part of the task list.
3. Interface to the EXEC
    3.1. When a message is received through a data stream, the interrupt routine will check the priority and either pass the message pointer on to the EXEC or tell the EXEC to process the message immediately and then return to the interrupt routine.
    3.2. The interrupt routine interfaces to the EXEC for passing message pointers, providing data buffers for streams, and updating registers about data streams for the EXEC to process at its leisure.
    3.3. The interrupt routine should be as short as possible. The interrupt routine and EXEC use the shadow registers and restore any non-shadowed registers to their original value when exited.

Executive Routine Functions

The executive (EXEC) routine is the operating system that interfaces to and manages the individual signal processing blocks of code. The EXEC should be about 500-1K words. The EXEC is an operating system that is programmable by MCU 310. It contains the basic information to manage data streams, algorithms, data memory buffers for control commands (messages), and how to interface with the interrupt routine and DFP 320's memory mapped registers. The EXEC is generally programmed by MCU 310 for the data stream and algorithm scheduling before execution and algorithms are initiated from data flow or the hardware timer. MCU 310 can send and receive messages directly to the EXEC using a data stream. For data modem systems, there is often a need to abort an algorithm and retrain. Messages allow a direct communication between MCU 310 and DSP EXEC.

EXEC Routine Functions

1. Data Stream Management
    1.1. data streams are programmed by number (STR#) and associated with a task (algorithm)
        1.1.1. the data streams for input or output of each algorithm are managed along with the scheduling of the algorithms
    1.2. data stream buffers are provided by the EXEC and used to control data flow
        1.2.1. the exec provides memory space for each buffer, including double buffering.
        1.2.2. DFP 320 will tell the interrupt routine (and in turn the EXEC) when a buffer is full (input buffer) or empty (output buffer). The EXEC may provide the next buffer for data at any time.
        1.2.3. the EXEC controls data flow of a data stream by providing data buffers, which usually controls the execution of an algorithm.
    1.3. data streams containing control information (messages) can have a high priority associated with them and allow flexibility in control
        1.3.1. the data buffers for messages are managed differently from data buffers for algorithm I/O. A message in a data buffer is referenced by a pointer and may sit until processed while data buffers for algorithms are reused more frequently.
        1.3.2. the interrupt routine informs the EXEC immediately of high priority messages.
2. Interrupt Routine Interface
    2.1. the EXEC provides address information on available buffers to the interrupt routine when it finds time to evaluate the buffer status. If a data buffer is needed and one is not available to the interrupt routine, it will inform the EXEC. The EXEC can provide one to keep data flowing or not provide one to stop data flow. The interrupt routine will not re-request the same buffer.
    2.2. DFP 320 and DSP share registers in data memory for control and status functions. The EXEC will access these registers.
    2.3. the EXEC knows which data stream numbers have been programmed. It provides this information to the interrupt routine to check for invalid data stream operations.
3. Algorithm Scheduling
    3.1. the EXEC manages which data streams are used for each algorithm.
    3.2. the EXEC manages the order of operations. When executing the task list, the EXEC manages the input buffers for upcoming algorithms and allows reuse of data buffers for completed algorithms.
    3.3. scheduled algorithms to execute, according to the conditions provided in the task list. One of the conditions will require an input data buffer to be full. The EXEC will be told by DFP 320 or an algorithm when data buffers are full or empty. An algorithm can begin execution by the EXEC receiving a message from the hardware timer. This provides timed scheduling (within several instruction cycles) and data flow scheduling together.

Overview of Algorithm Scheduling

The ability to schedule the signal processing algorithms has the obvious benefit of allowing an implementation with a flatter MIPS requirement across a frame, avoiding inefficient design, and to best use DSP's 300 memory. This system definition allows the flexibility of easily changing the scheduling through software and having scheduled tasks initiated when the input data is available or from hardware timing. Software scheduling should allow easier development of an optimum processing schedule and allows for changes in MIPS load for an algorithm, so long as the maximum allowed time is not exceeded. Functions other than the execution of signal processing functions can be scheduled. Some examples are communication between DSP 300 and MCU, a data transfer to the analog functions, and infrequent status checks by MCU 310. Since the relationship between functions is not a hardware block with a fixed control and timing, each function can be called when needed.

MCU 310 will download the task list, as mentioned before, to DSP's 300 executive. The execution of the task list schedules more than just the order of DSP's 300 algorithms. The scheduling can also involve data streams, DSP memory buffers, and the timer count. An 'example' of how tasks may be scheduled is given below. This represents the functional information that is controllable through the task list.

1. task 8—a DSP software task that takes the entire output data from task 7 as input. It runs when task 7 is complete AND a specified timer count has occured. Task 8 uses 2 output buffers to double buffer the data to the next task, which will begin when one buffer is full. The output buffer size is small compared to the total data output generated each time task 8 runs.
    1.1. memory management
        1.1.1. make task8__input1 buffer available to DFP 320 on task 6
        1.1.2. make task8__input2 buffer available to DFP 320 on task 7
        1.1.3. stop providing task8__input1 buffer to DFP 320 on task 9
        1.1.4. stop providing task8__input2 buffer to DFP 320 on task 9 (don't need either input buffers after task 8 is done)
        1.1.5. stop providing the task8__output1 buffer on task 10
        1.1.6. stop providing the task8__output2 buffer on task 10 this allows time for the last output buffer to be read
    1.2. start task 8 when:
        1.2.1. task8__input1 buffer is full, this could be a 1 word buffer that was written when the timer hit a specified count. Another example might be a write by MCU 310.
        1.2.2. task 7 is done
        1.2.3. task8__input2 buffer is full, this may be an output of task 7.
2. task 9—a hardware task that takes the output data from task 8 as input. It runs when task 8 has produced a small amount of data.
    2.1. memory management
        2.1.1. make task9__input1 buffer available to DFP 320 on task 8
        2.1.2. stop providing task9__input1 buffer to DFP 320 on task 10
        2.1.3. stop providing the task9__output buffer on task 13 this allows time for the output buffer to be read
    2.2. start task 9 when:
        2.2.1. task9__input1 buffer is full. DFP 320 and EXEC will handle the fact that the hardware block is getting data from 2 buffers. Task 9 will just see one stream of data being written to the hardware blocks input buffer DSP's 300 executive routine (EXEC) will perform management of the task list using the data streams. The EXEC will run occasionally from the interrupt routine and in between algorithms. The EXEC will perform memory management of data buffers located in DSP memory. The output buffer of a software algorithm could also be used as an input buffer to a hardware accelerator. DFP 320 would read the data and write it to the HW ACC block at the rate needed by the HW ACC block. A software algorithm and a HW ACC could both use the same data buffer as input to co-process two separate tasks.

The task list gives the conditions on which the EXEC should move from task to task. Multiple tasks could be enabled simultaneously in which case each would run when the input and output DSP memory buffers allow. An example would be processing lower rate audio data 'as it is available' while processing another task the majority of the time. DSP's 300 software algorithms need to update a status register when they have completely read or written a DSP memory buffer. The tasks are called from the EXEC and return to the EXEC unless they are actively processing. If the task is awaiting data but not complete, the task will be re-called until complete. The tasks in the task list, software and hardware, control the data rates to and from the task. This allows processing efficiencies and changes to be independent of the interface.

When the task list is complete, DSP 300 will enter IDLE mode and reduce power. DSP 300 exits IDLE when interrupted. DFP 320 controls DSP's 300 interrupt and would do so when a data stream buffer has been fully written/read. This provides a power down that is exited automatically due to the data flow, MCU, or timer event.

BaseBand Architecture

Figure 8:
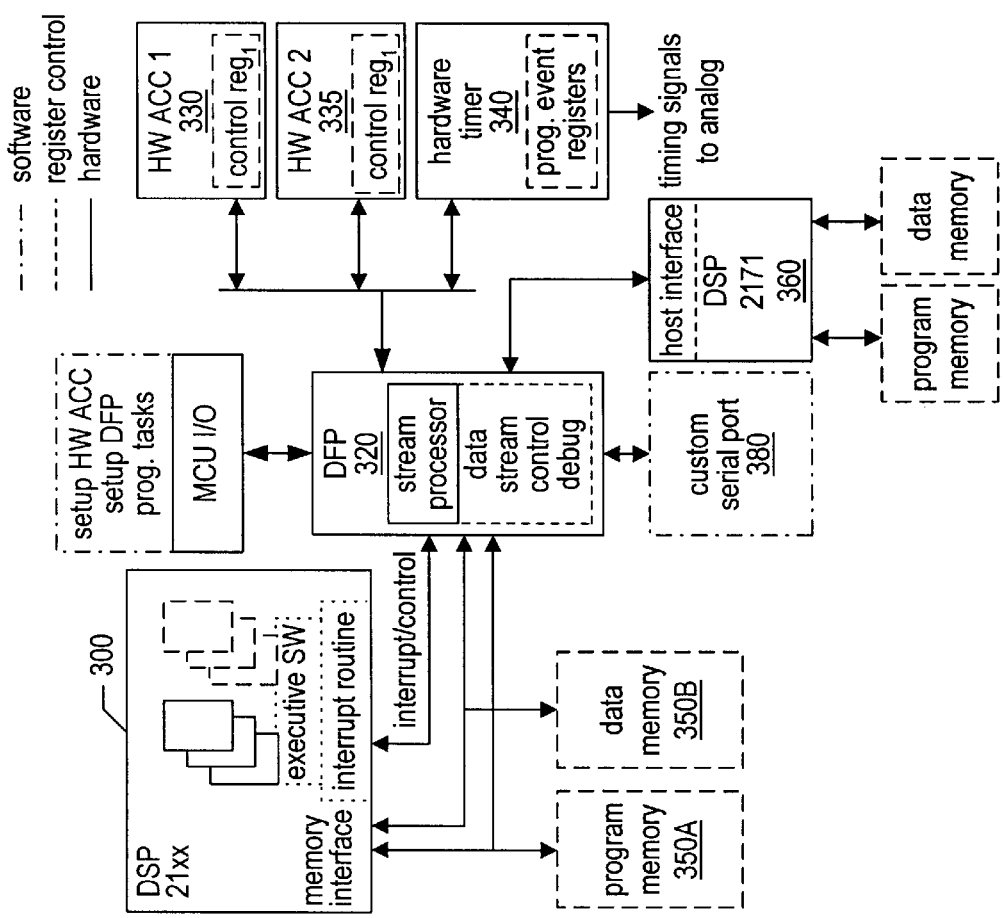
FIG. 8 shows a block diagram of the configurable architecture of the communications system.

This part describes each of the functional blocks in the platform. The system level task scheduling and data flow are implemented by the software and hardware execution of data streams. Each of the main blocks has a hardware and software function. The architecture partitions the control functions into software, configuration of hardware into programmable registers, and the data processing in DSP code or hardware. FIG. 8 shows this partitioning. The data flow processor is hardware to support the data flow and many of the operational details are given in that part. The 21xx DSP is embedded and the pin functions are given below.

ADI 2171 Pin Connections

This part lists the ADI 2171 pins, their connection within the platform and a brief description. For those pins with functions that are different than the 2171, a more detailed description is given. A 2171 pin may have a different connection, as most do, but if the function is identical to the 2171 as documented, no detailed description is given. The pin configuration is given in FIG. 9.

The pins listed below have some changes or additional functions to the 2171 functions.

| | |
|---|---|
| RESET__ | resets the entire device in addition to the 2171 reset functions |
| MMAP | This pin is removed and the MMAP function is fixed at MMAP = 1. Upon reset, the boot sequence is initiated by software. There is no difference in booting from a reset (hardware or software) or from software after a reset has occurred. This allows the software to have full control. |

| | -continued |
|---|---|
| BMODE | The boot mode is fixed to boot through the data interface, BMODE = 0. |
| IRQ1_ | This pin exists on the device. It is also mapped to the interrupt register in DFP 320 regardless of the state of the system control register 0x3FFF. The reset condition for both SPORTs is disabled and the interrupt and flag pins to be active on the SPORT1 pins. The function is the same as the 2171. When the system control register 0x3FFF enables SPORT1 and the SPORT1 CONFIGURE bit is set to 1 the TFS1 function is the same as the 2171. |
| IRQ0_ | This pin exists on the device. It is also mapped to the interrupt register in DFP 320 regardless of the state of the system control register 0x3FFF. The reset condition for both SPORTs is disabled and the interrupt and flag pins to be active on the SPORT1 pins. The function is the same as the 2171. When the system control register 0x3FFF enables SPORT1 and the SPORT1 CONFIGURE bit is set to 1 the RFS1 function is the same as the 2171. |
| FO | The flag out pin functions as in the 2171 and is controlled by the system control register 0x3FFF depending on the state of the SPORT1 ENABLE and SPORT1 CONFIGURE bits. It is also mapped to the IRQ register in DFP 320 and is an input to DFP 320. |
| FI | The flag in pin functions as in the 2171 with respect to the 2171 software. However it is a direct hardware input from DFP 320 block. Therefore, the state of FI is available to software regardless of the state of the SPORT1 CONFIGURE bits. It is also mapped to the IRQ register in DFP 320 as a read only bit. |
| FL2-0 | The flag bits are connected to DFP 320. Their functions are the same as the 2171. There states are mapped to the IRQ register in DFP 320. |
| PWD_ | The power down function can be initiated by the pin or through software by setting the POWER DOWN FORCE control bit in the ANALOG AUTOBUFFBR/POWERDOWN control register. A hardware power down causes the entire device to enter a power down state. The 2171 power down function is the same. The remainder of the device must enter a low power state where clocks are stopped at the appropriate phase. DFP 320 control remains active to receive input. The power down mode can be exited through the software initiated power down. Since all bus activity is buffered to the core, DFP 320 will generate a power down of the non-core circuitry after detecting the write of the POWER DOWN FORCE control bit to the ANALOG AUTOBUFFER/POWERDOWN control register. |
| PWDACK | The power down acknowledge pin incorporates the valid powerup condition of the core as well as the entire device. The logic states are the same as the 2171. The clock generator's outputs are valid when the PWDACK pin is driven low. |
| BR_ | The bus request is used for interface between DSP 300 and DFP 320 to allow DFP 320 to access the memory directly. It is a DFP output. DFP 320 will assert BR_ to perform reads and writes of program and data memory. BR_ is used during the boot sequence. The 2171 'GO' mode works as normal. |
| BG_ | Bus grant is output from DSP 300 to DFP 320. Its function is similar to the 2171 except the bus is granted to DFP 320 for the section of RAM requested and the RAM is on chip. |
| BGH_ | The bus grant hang pin is output by DSP 300 to DFP 320. Its function is similar to the 2171. It is used to allow DSP 300 to request the memory bus when it is currently granted to DFP 320. DSP 300 can assert the BGH_ signal to DFP 320. In the 2171, it is designed for a multiprocessor environment. Here it can be used to allow DFP 320 to relinquish the bus to DSP 300 and request it back after a programmable delay. |

DSP Memory

The following parts will provide a more detailed description of the interface between DSP 300, data flow processor 320, and the RAMs 350A and 350B. The platform contains the full addressable program and data memory RAM space on chip, 16K each. The 21XX Host Interface Port has not been included. DFP 320 performs the function of interfacing to DSP 300 and RAM 350. The RAM architecture and interface to the core is different from the 2171. The program and data RAM have each been partitioned into 4K blocks. A diagram of the memory architecture is given in FIG. 10. Memory is referenced by a 15 bit address space generated by DFP 320. DFP 320 outputs the bus memory address, BMA [14:0]. The RAM address space is given below where the msb selects the program or data memory and bits [13:12] select the 4K block of memory. The next part describes DFP 320 and includes details on the signal and functional interface to memory 350.

The impact on DSP's 300 code for this memory structure is there is no external memory bus. DSP's 300 operation with the GO bit is similar. The GO bit should always be enabled. Up front scheduling of operations should keep DSP 300 and DFP from the same block of memory for long periods of time. DSP's 300 code has no way of knowing where DFP 320 is accessing. The IRQ2, Flag IN and Flag Out pins are dedicated to the interface to DFP 320.

Figure 10:
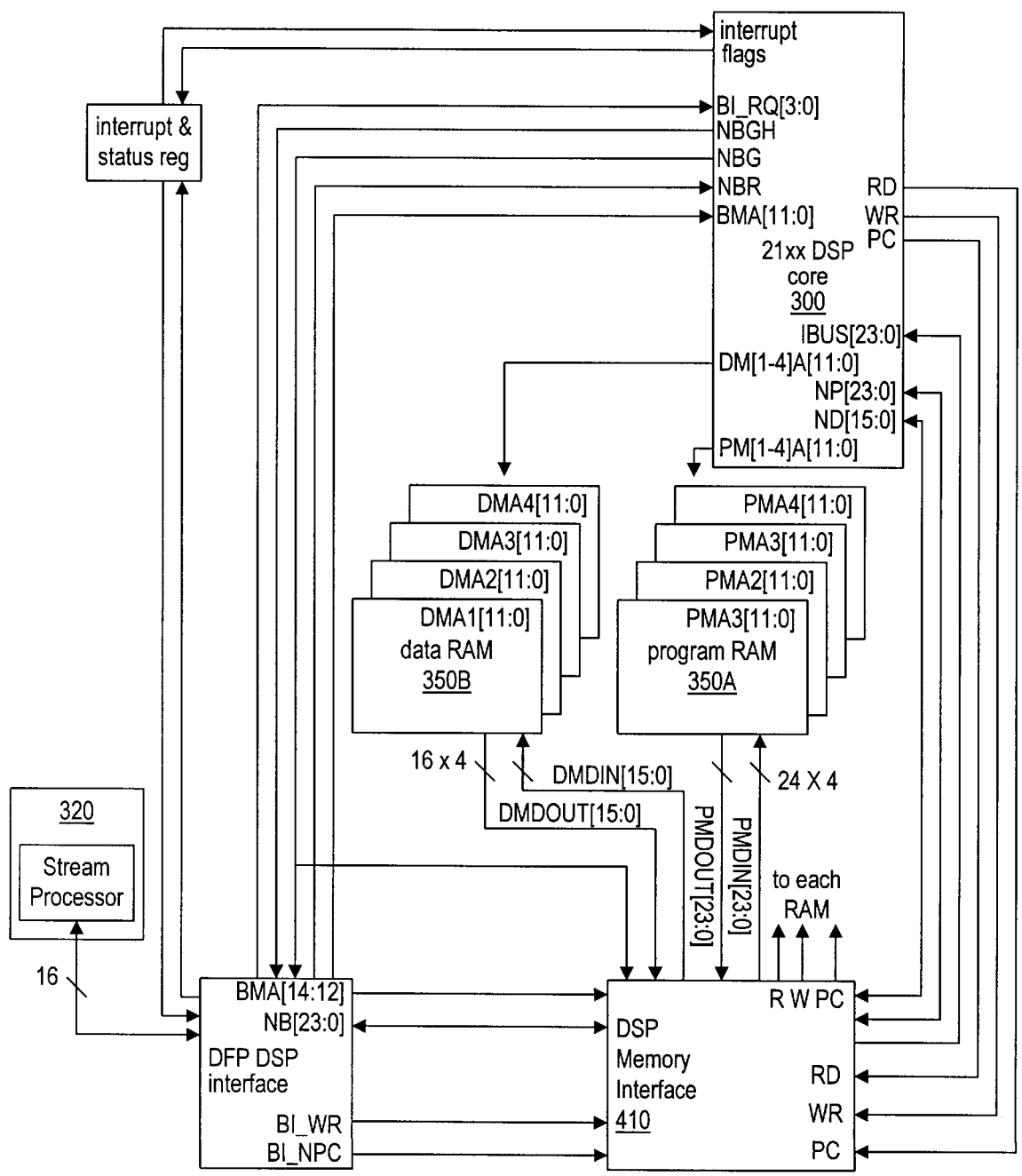
FIG. 10 shows a block diagram of the memory architecture.

DFP 320 has direct memory access to service the data streams and interface with DSP 300. DFP 320 and DSP 300 have the ability to each write to two different blocks of memory simultaneously. They can not access the same block at the same time. DFP 320 writes to both the program and data memory at the instruction rate. It takes one instruction cycle to give the RAM bus back to DSP 300 after each DFP RAM access. The instruction immediately following the last DFP read or write can not be used by DSP 300 for an access to the same memory block. DFP 320 uses a modified version of bus request and grant to gain access to the memory buses. A more detailed diagram of the RAM interface is shown in FIG. 10. This block diagram does not show all signals that interface DSP 300, memory interface and bus interface blocks. DSP 300 provides eight sets of addresses for the data memory 350B and program memory 350A, DM[1-4]A [11:0] and PM[1-4]A[11:0]. These are used to address the 4K address space for each memory block. The selection of the memory block is done by the RD, WR, & PC signals from DSP 300 or by the upper 3 bits of the BMA address. Each RAM block has a data in and data out bus that is muxed & demuxed in the memory interface block to DFP 320 or one of DSP's 300 buses.

DFP 320 can only access one section of the RAM memory 350 per request. In order to obtain a grant to a different section of the memory 350, DFP 320 must remove the bus request, wait for bus grant to be removed, change the memory address BMA[14:0], and then re-request the bus. The bus request signal (BR) is used to request the memory bus for the section of the memory referenced by the BMA address. DSP 300 will grant DFP 320 the memory block requested by asserting BGRANT. This grant will occur on instruction boundaries, the same as in the 2171. DSP 300 will continue to run if the GO mode is enabled until it needs to access the section of RAM granted to DFP 320. If the GO mode is not enabled, DSP 300 will stop as in the 2171. The GO bit should always be enabled on the platform. The GO MODE is MSTAT[6]. The bus request and grant function of the 2171 are quite different because the cycles to all sections of memory are the same and are not accessed with external memory cycles.

DSP's 300 bus grant hang signal, NBGH, can be used to remove DFP 320 from the memory section is currently has granted. The NBGH signal will be output from DSP 300 on phase 2. This is the same phase as the NBG output. If NBG is used asynchronously to begin a RAM access cycle, this cycle should be finished before implementing the bus grant hang. If the NBG and NBGH are latched and used on CK12 trailing edge then the RAM access can be saved until after the hang wait. When the NBGH signal is active, DFP 320 will remove the NBR signal immediately or at the end of the next instruction cycle, finishing the one in progress as necessary. The NBR will be removed on phase 1. DFP 320 will then not request any block of the RAM again until 32 times the BGH wait plus one as defined in the control register, CTLREG[2:0]. One wait equals one instruction cycle. Therefore CTLREG[2:0] provides a 32 to 256 instruction cycle wait.

This RAM bus architecture uses some of the signals in DSP's 300 IOC block previously used for external/internal memory functions. The IOC block of DSP 300 has been changed to implement this RAM architecture. However, all DSP RAM memory is accessed without extended instruction cycles. This architecture allows:

1) simultaneous access of different sections of the RAM 350 by DFP 320 and DSP 300
2) fewer cycles/access for the host to RAM interface because 24 bit words are written in one cycle and the address does not have to be written first to an address pointer as in the 2181 IDMA
3) memory that is sometimes considered as external can be accessed by DSP 300 without extended W/R cycles for multiple accesses/instruction cycle.

DFP 320 accesses a 16 bit address space as given above. DSP program memory 350A and data memory 350B are each 16K words maximum for the ADI 2171. For designs with additional memory, DFP 320 can be used to access additional memory. FIG. 11 shows the memory mapping for DSP's 300's address to the BMA generated address.

Data Flow Processor (DFP)

This part will describe the functions of the data flow processor. DFP 320 has the following functions:

1) DFP 320 is a parallel interface to DSP 300 using direct memory access. DFP 320 serves as a hardware interface to DSP's 300 interrupt and executive operating software.
2) DFP 320 serves as a programmable hardware block for data flow in the platform. It manages data streams that have been programmed through its internal registers 480.
3) It serves as a bus interface by having 3 custom interfaces for DSP 300, MCU, and HW ACC blocks 330, 335, and 340. These allow the stream processor 500 to work independent of the bus structure.
4) DFP 320 decodes an address space for its accessible addresses. DFP 320 maps its address space to that of MCU 310.
5) Contains registers for platform control of the data streams, clocks, power down, and debug functions.

Figure 12:
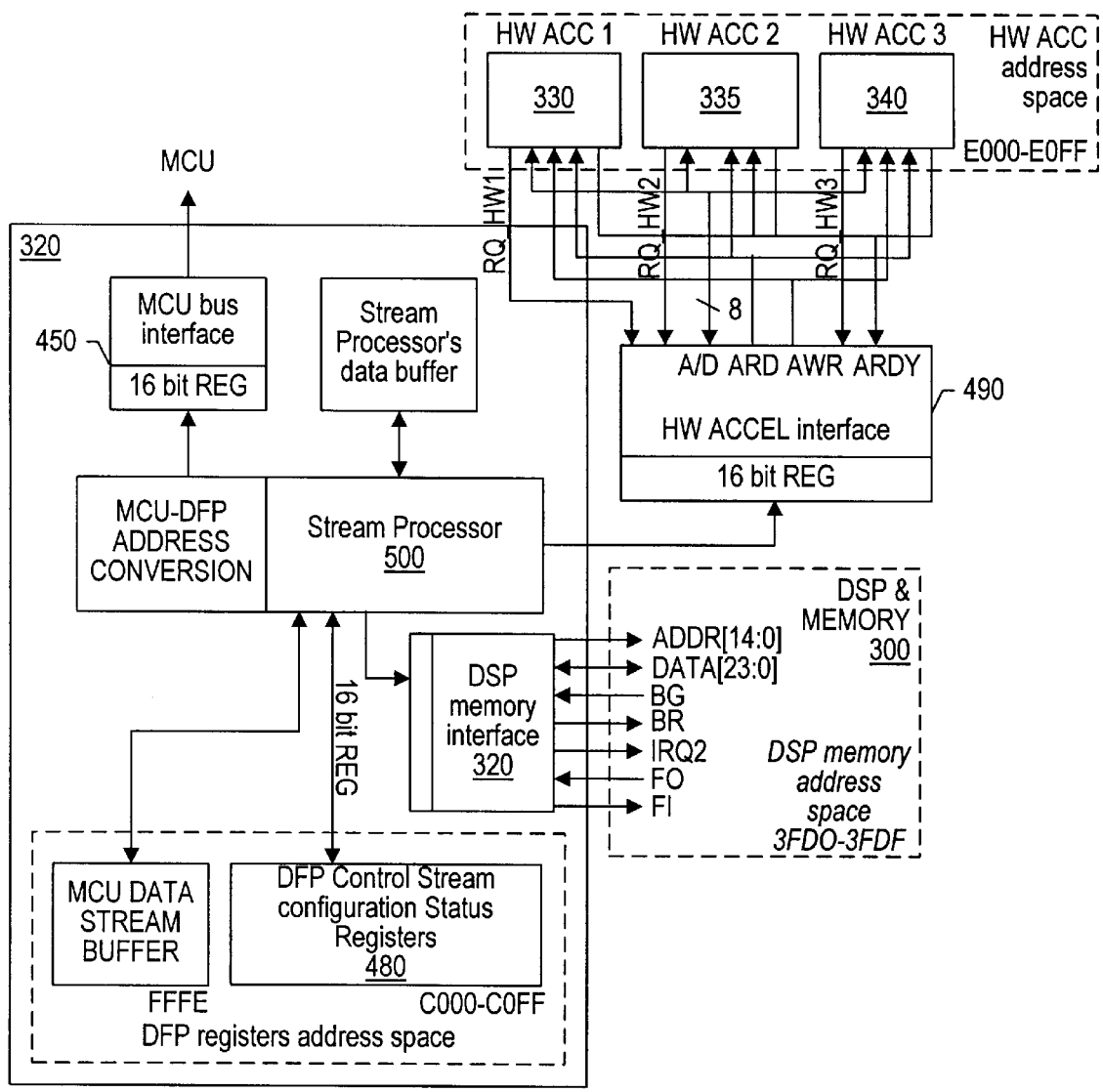
FIG. 12 shows a block diagram of the data flow processor.

FIG. 12 shows a block diagram of the major functional blocks. DFP 320 interfaces to three different bus configurations in the platform; the micro-controller 310, DSP memory 350, and hardware blocks. Each interface contains a functional block to provide buffering to allow interfacing to the stream processor 500 16 bit bus width.

MCU 310 is the master of MCU 310-DFP bus. DFP 320 uses MCU 310BUFREG, MBUFSTRREG, and MINASTR-REG registers along with an interrupt pin to let MCU 310 write or read data. Since MCU 310 interrupt may take significantly longer than other data transfers, data stream packets are buffered in MCU 310 DATA STREAM BUFFER, address FFFE.

The stream processor 500 can use a buffer to keep data stream packets in its own data buffer when transferring between addresses. This buffer space helps manage multiple data streams by separating the data transfers across different buses.

DFP Functional Description

The Stream processor 500 is the main block containing a state machine to automatically transfer data via a programmed data stream. DFP 320 contains registers 480 that are programmable by MCU 310 to configure DFP 320 for managing the data streams. The register descriptions are given below. DFP 320 can manage (for this implementation) 32 streams. For each stream there is a set of 4 registers 480 to control the stream. The stream processor 500 uses registers 480 to transfer data between to addresses in packets. The amount of data in a packet is programmed in the stream control register. Each stream has a programmed buffer size. The stream processor 500 will keep track of the amount of data transferred on a data stream until the buffer size is met. It then considers the data stream inactive and interrupts either MCU 310 or DSP for another buffer. The stream processor 500 will transfer a packet of data for each data stream when the source and destination are ready. The definition of when a source or destination address is ready to transfer data is different for each interface. The interface handshakes are cover below. The stream processor 500 is designed to only require minimum of control during data transfer of an active data stream. It automatically takes care of addressing, incrementing addresses for DSP memory and keeping the address constant for a hardware block.

The stream processor 500 also transfers data between the interfaces for MCU direct reads and writes. The bandwidths for direct I/O and different data streams will vary. In order to insure a worst case latency, the stream processor 500 checks the following top level functions in round robin to determine what data should be transferred.

Top Level Stream Processor Events

MCU direct read or write

Data stream processing finds the next available active stream number to process, in order of stream numbers, increments from the last processed stream number.

The DSP 300 has provided a stream buffer, get the buffer info from the memory mapped registers. The stream processor 500 has latch Flag Out falling edge.

Request a data stream buffer from DSP 300 or MCU. A data stream in 'inactive'

Within the data stream processing top level task are several checks the stream processor 500 must perform to manage the data flow. Each time through the top level list of events, the stream processor 500 is going to attempt to perform one data stream packet transfer.

Data Stream Processing

Check if the stream processor 500's data buffer is full. If so, attempt to complete a packet transfer out of the buffer.

Check the list of stream numbers of active streams. Process the next stream number in the list.

Check the list of stream numbers that aren't OFF. The status of a stream may need to change as a result of a hardware block's request signal, a DSP data memory buffer, or MCU programming. Update the status.

Figure 13:
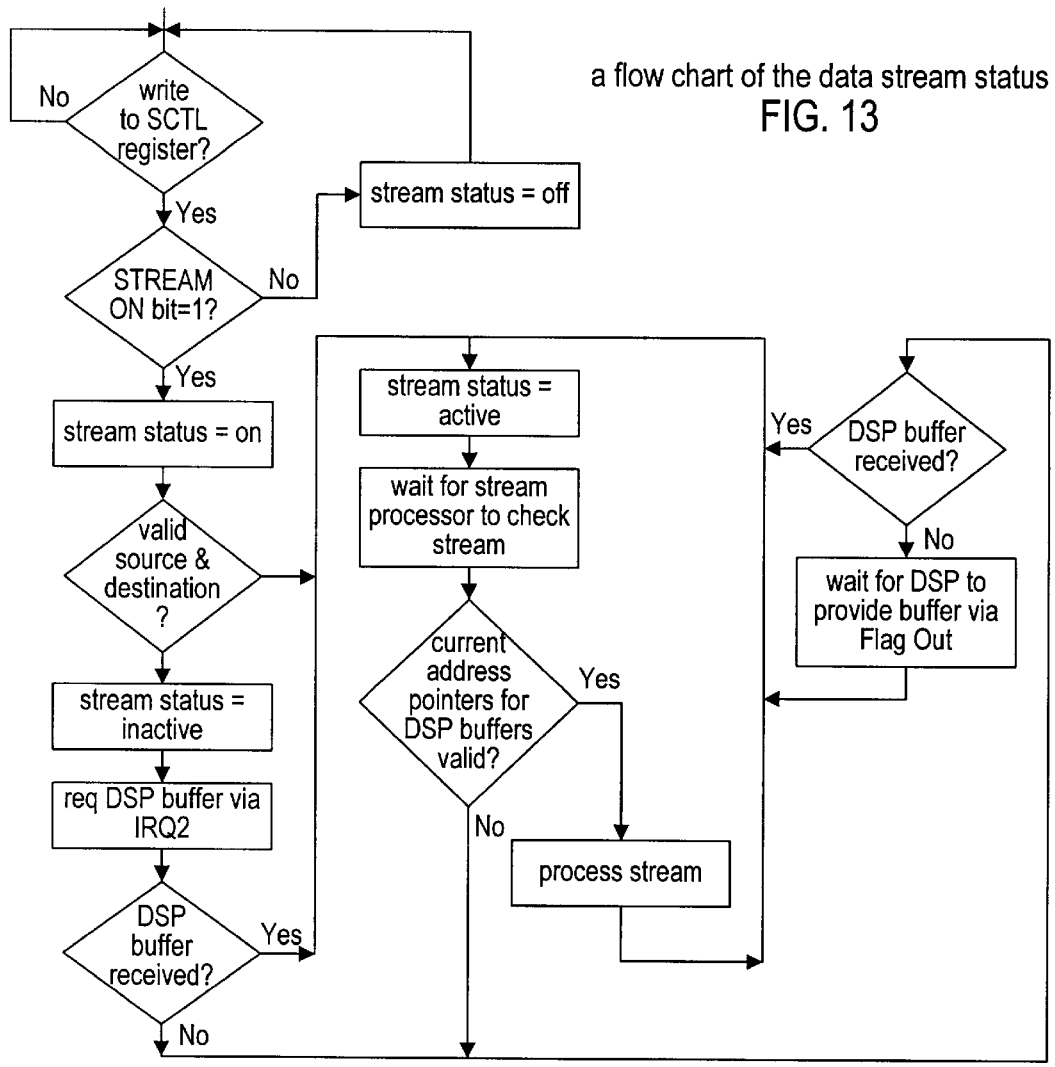
FIG. 13 shows a flow chart of the data stream status.

The stream processor 500 maintains a status on each data stream programmed. The status can be ON, OFF, ACTIVE, or INACTIVE as defined before. FIG. 13 shows a flow of the status of each data stream.

DFP to DSP: Hardware Interface

The data flow processor (DFP) uses the RAM to move data to and from DSP 300. It interfaces to DSP 300 to request a memory block of the program or data RAM and to pass data and control information to and from DSP 300. DFP 320 and DSP share the following signals:

DSP Interface Signals

IRQ2—DFP 320 uses this signal to interrupt DSP 300. This starts an interrupt routine to service DFP 320. This is a DSP input pin that is dedicated to DFP 320. It is a read only bit in DFP 320's control register, CTRLREG.

IRQ0—This input can be muxed to DFP 320 control register, CTRLREG, for access by software running on a host controller. The control for the mux is in DFP 320's control register, CTLREG. By muxing the RFS1 pin to the IRQREG, the interrupt is available for writing and reading by software, however the configuration state of the SPORT1 must be set to 0 for interrupts and flag mode, System Control Reg (ox3fff) [10]=0.

IRQ1—This input can be muxed to DFP 320 control register, CTRLREG, for access by software running on a host controller. The control for the mux is in DFP 320's CTRLREG. By muxing the RFS1 pin to the IRQREG, the interrupt is available for writing and reading by software however the configuration state of the SPORT1 must be set to 0 for interrupts and flag mode, System Control Reg (ox3fff)[10]=0.

Figure 14:
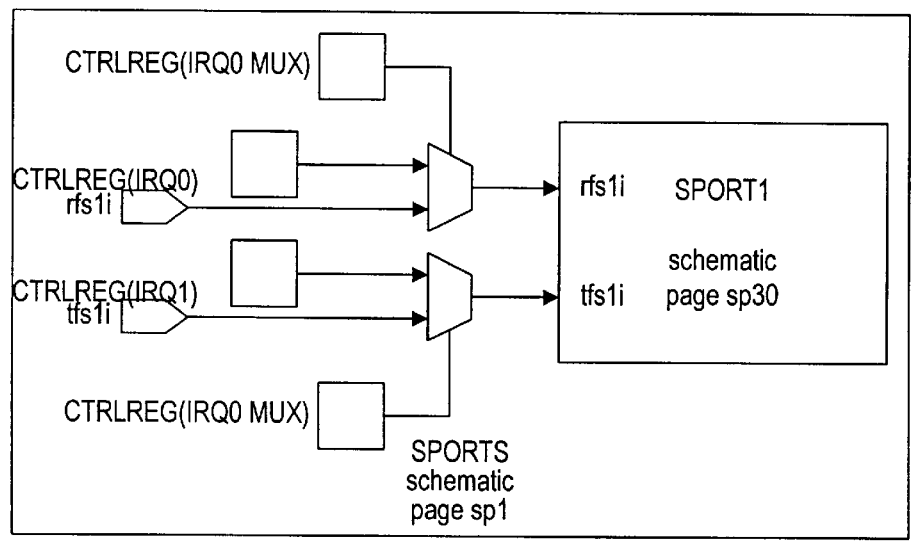
FIG. 14 shows the DFP-DSP interface for IRQ0 & IRQ1.

FI—The FLAG-IN pin is used by DFP 320 to inform DSP 300 that it is reading registers mapped to DSP memory. The FLAG-IN will be an output of the data flow processor to the FLAGIN signal on the schematic page 'dspcore', where it is an input to the sequencer (FIG. 14). (NOTE that the signal name is FLAGIN but it functions as FLAGIN_ as seen by DSP's 300 software.) The FLAGIN signal should not be connected to the DR1 pin, as on the ADI 2171. FLAGIN is mapped to DFP 320's CTRLREG for read only.

FO—The FLAG-OUT pin is used by DSP 300 for three purposes. When FO is high it will keep DFP 320 from accessing the memory mapped registers. When FO transitions from 1=>0 it indicates to DFP 320 that the IRQ2 routine has ended. When not the IRQ2 routine, a negative edge on FO informs DFP 320 that a new DSP memory start address and DSP memory data block size are available. DSP 300 will set FO to 1 prior to reading or writing data from memory mapped registers. DSP 300 will set FO to 0 at the end of the IRQ2 routine or when done providing data through the memory mapped registers to DFP 320. FO will be latched by DFP 320 using DFP 320 clock CK12. DSP 300 must hold FO=1 for at least 2 instruction cycles. DFP 320 may access the memory mapped registers after FO=0. DSP's 300 signal 'FLAGOUT' from schematic page SP1 should be sent to DFP 320 as an input and mapped to DFP 320's CTRLREG for read only.

FL0-FL2—FLAG 0-2. These 2171 device pins are mapped to DFP 320 interrupt register, IRQREG, for read only, depending on the state of the enable bits in the interrupt register.

PWR_L—The POWER DOWN pin is an input to DSP 300. There also needs to be a device pin which is used to power down the entire device. It will have to be decided (TBD) if the controller should receive the device's power down pin and control the power down of DSP 300 or if the pin should be a logic OR at DSP 300 with the controller power down signal.

PWDACK—The POWER DOWN ACKNOWLEDGE pin is an output of DSP 300. It lets DFP 320 and clock generator know the clocks can be stopped to the core.

RAM Interface Signals

NBR—The BUS REQUEST is used to request one section of memory, as determined by the BMA[15:0]. NBR is an active low input to DSP 300.

NBG—The BUS GRANT is used to control a section of memory, as determined by the BMA[15:0], for use by DFP 320. NBG is an active low output of DSP 300.

NBGH—The BUS GRANT HANG is used to allow DSP 300 to request the bus back from DFP 320 for the section of RAM granted to DFP 320. DFP 320 must remove NBR and wait a fixed number of cycles, as programmed in the control register in BGHW[2-0], before re-requesting the RAM bus for ANY section. NBGH is an active low output of DSP 300.

NB[23:0]—This is the bi-directional data bus for RAM interface. It is used to read and write to program and data memory. For bus interface access to data memory, NB[15:0] bits are used for data. When DFP 320 is reading the data memory, NB [23:16] are not driven by the RAM interface and are high impedance.

BMA[15:0]—This is the 16 bit address bus used to drive program and data memory selection and addressing. The address can only change when NBR or NBG are not active. This bus is an output of the bus interface. Bit 15 is used to access one of two optional 16K program memory pages. Bit 14 is used to access program or data memory. Bits 13:0 are used to access the 16K memory space where the 2 msbs are used to reference the appropriate memory block.

DFP_NPC—bus interface RAM pre-charge signal. This must be driven by DFP 320 for RAM access. This signal is low during pre-charge.

DFP_WR—bus interface RAM write. This signal is high for RAM writes and low for RAM reads. This is driven by DFP 320 for RAM accesses.

Figure 15:
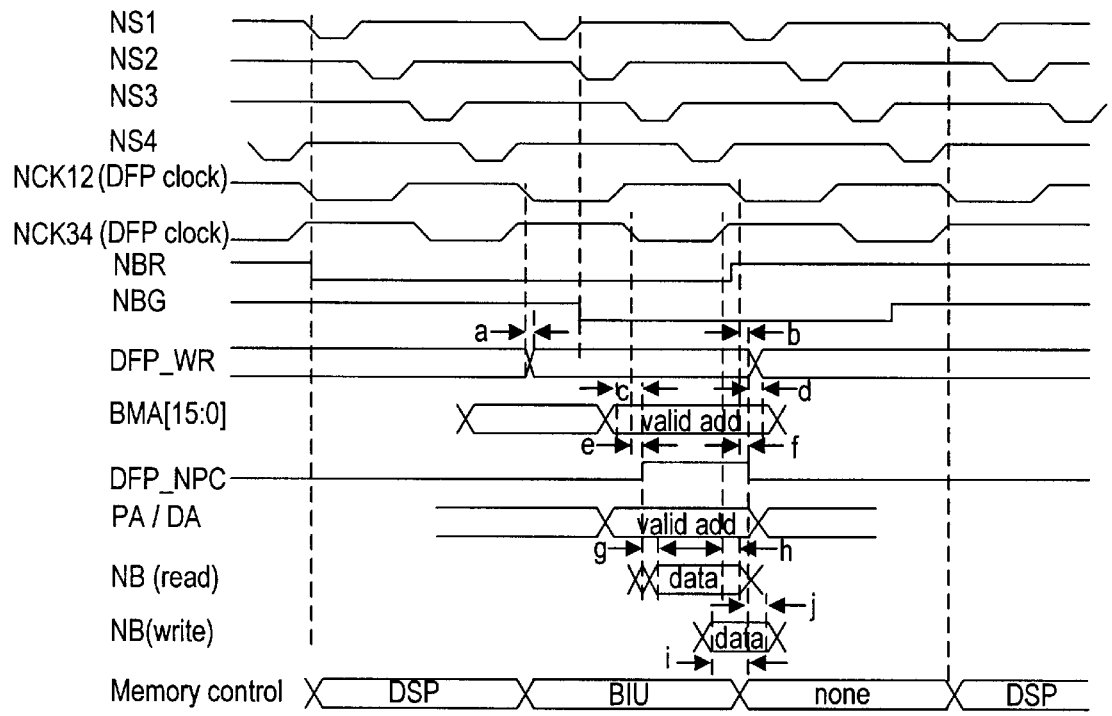
FIG. 15 shows the DFP-RAM interface with single access R/W.
Figure 16:
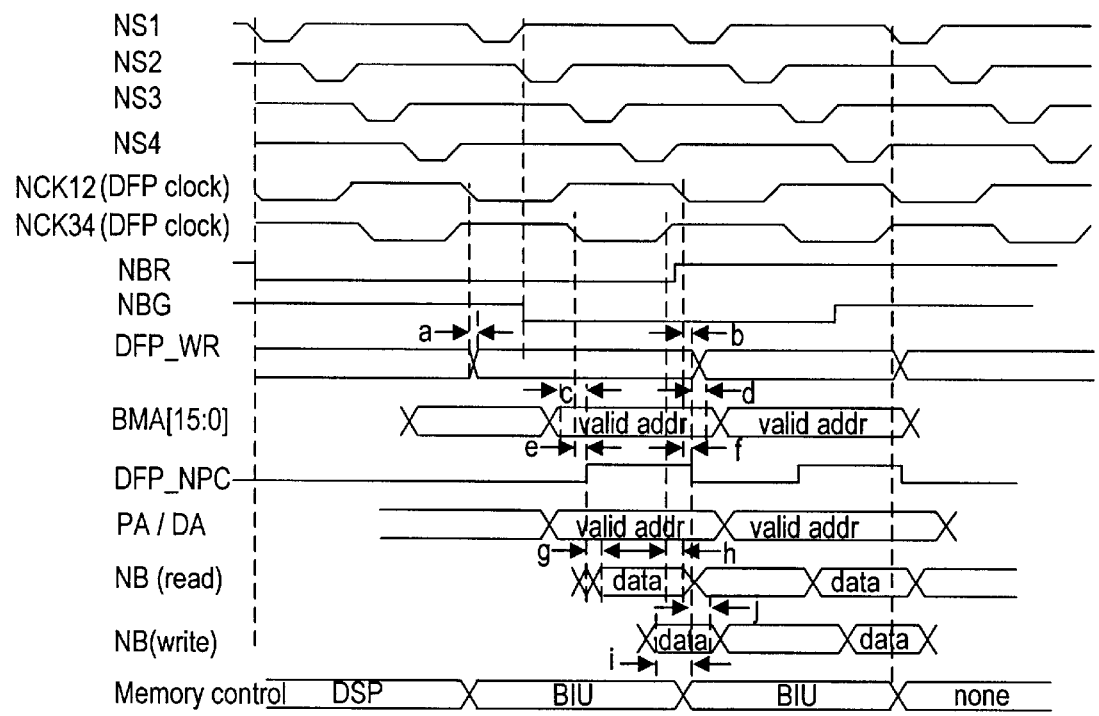
FIG. 16 shows the DFP-RAM interface with double access R/W.

The timing diagrams in FIG. 15 and FIG. 16 show the interface for writing or reading for one and two data words respectively.

Notes for FIG. 15 and FIG. 16

The RAM read data remains valid until the next rising edge of DFP_NPC or until NBGO goes high (inactive).

All timing is with respect to DFP 320 clocks, NCK12 & NCK34, and DSP's 300 clocks do not effect DFP 320 access. The NBR is latched on the trailing edge of DSP 300 phase 1 clock, NS1. Therefore the skew between the NCK12 and NS1 must allow an adequate setup time for NBR to NS1.

Data read from the RAM should be latched by NCK34 rising edge in DFP 320.

DFP_WR is high for write and low for read.

NBGH is not shown in the above timing diagrams. This is a DSP clock phase 2 signal that will occur on the same clock edge as a bus grant. See the above text description on NBGH.

DFP to DSP: Handshake Descriptions

DFP 320 will need to communicate with DSP 300 for transfer of all data. This includes commands for control and data for signal processing. DSP's 300 code to interface with DFP 320 will be implemented in the interrupt routine associated with IRQ2 and in DSP's 300 software that processes the information provided by the data flow processor. The reference to DSP 300 below is intended for both of these. Below is a description of the communication between DSP 300 and DFP 320.

DFP Initiated Communication

1) For DFP writes to DSP memory, except for the memory mapped registers, DFP 320 sets the BR signal of DSP 300 and expects BG on the next cycle. The handshake between DSP 300 interrupt routine and DFP are not involved.

2) For DFP initiated read or writes to the registers mapped to DSP data memory, the following handshake occurs.

DFP 320 will set the FLAG IN, FI, signal to 1. This keeps DSP 300 from writing the same registers until DFP 320 access is complete.

DFP 320 will check to make sure FO=0. If it is high, DSP 300 has access to the memory mapped registers and DFP 320 will set FI=0.

DFP 320 will read or write the registers using the BUS REQUEST, BR, and directly drive the address and data bus to the memory.

DFP 320 will set FI=0 and pulses IRQ2=1 to interrupt DSP 300

DSP 300 will drive FLAG OUT, FO, to 1 and check FI before reading any memory mapped registers. The interrupt 2 routine will read the memory mapped registers in a specified order. The IRQ2 and EXEC routines will perform any OS functions needed which may include writing data to the memory mapped registers for DFP 320.

DSP 300 will set FO=0 when it exits the IRQ2 routine.

DFP 320 will use the falling edge of FO to indicate the end of the IRQ2 routine and will Set FI=1 and read some of the memory mapped registers looking for any data stream or status information from DSP 300.

DFP 320 will set FI=0 when done reading the registers in data memory.

DSP Initiated Communication

1) DSP 300 will be able to initiate data flow through the signal interface to DFP 320. This acts as an interrupt to the stream processor 500. All data flow from algorithms or the OS routines are through host software reading or writing memory directly or through data streams. The flow of data through DFP 320 is mainly controlled through DFP 320 having access to buffers in DSP's 300 memory. DSP's 300 EXEC routines will provide these buffers. This outlines the handshake routine when DSP's 300 software wants to give information to DFP 320 for data streams, stream status, or interrupts.

DSP's 300 EXEC software will determine that DFP 320 registers mapped to data memory have to be written DSP 300 will set FO=1 to keep DFP 320 from accessing the registers.

DSP 300 will check to make sure FI=0. If it is high, DFP 320 has access to the memory mapped registers and DSP 300 will set FO=0.

DSP 300 will update one function at a time. If several functions need to occur such as the providing buffers for 2 data streams and updating the stream status, each will be provided separately. It is important to keep the interrupt routine and interface as efficient as possible. The data flow through the blocks works more efficiently and with less latency overall by letting data flow in the simplest manner. Having to read and process all registers slows the interface down for the most frequently used tasks.

When DSP 300 is done writing to the mapped registers it will set FO=0. This is DFP 320's cue to read the registers.

DFP 320 detects the FO 1=>0 edge, completes the current stream processing it may be doing and sets FI=1.

DFP 320 will read the mapped registers in a specific order, looking for the most frequently used interfacing functions first. This should be DSP 300 providing memory buffer space for a programmed data stream.

DFP 320 will set FI=0 when done reading the registers and continue processing streams.

DFP to MCU: Handshake Descriptions

MCU Writes to DFP Register Space

MCU 310 can perform direct writes to any of DFP 320 register space. There are three sets of address spaces DFP 320 can access. These are DSP's 300 memory, the registers in the hardware blocks, and DFP 320's own registers. DFP 320 will decode the address and send the data to the register or memory. MCU 310 can perform reads and writes independent of data streams to or from MCU 310.

When MCU 310 performs a write to DFP 320, DFP 320 will complete the write cycle and store the data. DFP 320 will then write the data to its own internal registers or gain access to DSP's 300 memory or a hardware block via DSP's 300 memory bus or the HW ACC bus resp. If a MCU write cycle is begun and DFP 320's internal stream buffer is full, is will not immediately acknowledge the write cycle. This condition should not occur if the buffer is large enough.

MCU Reads of DFP Register Space

When MCU 310 performs a read cycle to DFP 320, DFP 320 will need to complete the process it may currently be performing. On average it will be available nearly immediately. DFP 320 will first decode the address, gain bus access if necessary, and then fetch the data. MCU 310 will need to wait for the data to have the read cycle completed. This will vary depending on the address location. DFP 320's address should be available for the $1^{st}$ data cycle. There will be some delay for the HW ACC and DSP memory addresses.

MCU-DFP Interface for Data Streams

MCU 310 and DFP may transfer data through data streams programmed in DFP 320. Data streams may be flowing to or from MCU 310. All data will use a common buffer for MCU 310 interface, MCU 310 data stream buffer (MCUBUFREG). DFP 320's stream processor 500 will interrupt MCU 310 when a read or write cycle is needed to transfer data for one of the data streams. The handshake uses some of the registers listed in the part on DFP Register Descriptions. The interface for both situations, data to MCU 310 and data from MCU 310 are listed here.

For data streams to MCU 310, DFP 320 will load MCU 310 Data Stream Buffer, MCUBUFREG, and interrupt MCU 310.

DFP 320 will begin a data transfer of a data stream to MCU 310 by detecting data is available to transfer. This is done differently depending on the source. For data from DSP 300, DSP 300 will provide a stream number and data buffer to DFP 320. For data from a hardware block, DFP 320 will detect a hardware block's request line which has been programmed for the particular data stream in progress.

DFP 320 will write the stream number in MCU 310 INACTIVE STREAM #, MINASTRREG.

DFP 320 will write a 1 to the IRQREG[Packet Transfer IRQ] bit. This bit will cause a MCU interrupt. This bit can be masked from causing the interrupt for MCU polling.

Upon interrupt, MCU 310 will first read DFP 320's IRQREG. Because the Packet Transfer IRQ bit is set, MCU 310 will know a data stream needs servicing (read or write).

MCU 310 will next read DFP 320's MCU INACTIVE STREAM #, MINASTRREG. MCU 310 will use the stream number to determine the direction of the stream and how many words are to be transferred each interrupt. This is the packet size that was programmed in the stream's control register by MCU 310.

MCU 310 will read MCU 310 DATA STREAM BUFFER, MCUBUFREG.

At this point MCU 310 has received the data and is done. It must now service the interrupt. Before doing so, it may use this opportunity to fill the empty MCU DATA BUFFER with data for a (different) data stream MCU 310 may have in its queue for outgoing data.

To provide data for an outgoing data stream, MCU 310 writes the data to MCU 310 DATA STREAM BUFFER, MCUBUFREG.

MCU 310 writes the stream number in MCU 310 INACTIVE STREAM REG, MINASTRREG.

MCU 310 clears the interrupt by writing a 1 to the IRQREG[Packet Transfer IRQ] bit If it does not wish to do this, MCU 310 will write a 0 to MCU 310 INACTIVE STREAM REG, MINASTRREG.

MCU 310 clears the interrupt by writing a 1 to the IRQREG[Packet Transfer IRQ] bit For data streams from MCU 310, DFP 320 will provide stream numbers to MCU 310 for data streams that are ready for data. When MCU 310 has data to write it will provide the stream number to DFP 320. DFP 320 will interrupt MCU 310 for the data when ready. This method could be improved by adding separate read and write buffers for MCU 310 and control bits for MCU 310.

DFP 320 will begin a data transfer of a data stream from MCU 310 by detecting data is needed by the destination address. This is done differently depending on the source. For data to DSP 300, DFP 320 must have the buffer address and size for the data stream. For data to a hardware block, DFP 320 will detect a hardware block's request line which has been programmed for to the particular data stream in progress.

DFP 320 will write the stream number in MCU 310 INACTIVE STREAM #, MINASTRREG.

DFP 320 will write a 1 to the IRQREG[Packet Transfer IRQ] bit. This bit will cause a MCU interrupt. This bit can be masked from causing the interrupt for MCU polling.

Upon interrupt, MCU 310 will first read DFP 320's IRQREG. Because the Packet Transfer IRQ bit is set, MCU 310 will know a data stream needs servicing (read or write).

MCU 310 will next read DFP 320's MCU INACTIVE STREAM #, MINASTRREG. MCU 310 will use the stream number to determine the direction of the stream and how many words are to be transferred each interrupt. This is the packet size that was programmed in the stream's control register by MCU 310.

At this point MCU 310 has received the stream number needed data. It must now service the interrupt. Before doing so, it may fill the empty MCU DATA BUFFER with data for a the stream number given or for a different data stream MCU 310 may have in its queue for outgoing data.

To provide data for an outgoing data stream, MCU 310 writes the data to MCU 310 DATA STREAM BUFFER, MCUBUFREG.

MCU 310 writes the stream number in MCU 310 INACTIVE STREAM REG, MINASTRREG.

MCU 310 clears the interrupt by writing a 1 to the IRQREG[Packet Transfer IRQ] bit If MCU 310 does not wish to provide data for a stream, MCU 310 must write a 0 to MCU 310 INACTIVE STREAM REG, MINASTRREG.

MCU 310 clears the interrupt by writing a 1 to the IRQREG[Packet Transfer IRQ] bit MCU 310 may provide a packet of data for a data stream that DFP 320 is waiting for at any time. MCU 310 will write the data stream number to the STREAM # FOR MCU BUFFER register, MBUFSTRREG.

DFP 320 will detect writes to this register. As soon as it is able, which will be immediately in most cases, DFP 320 will interrupt MCU 310 for the data.

DFP 320 will write the stream number from the MBUFSTRREG to MCU 310 INACTIVE STREAM register, MINASTRREG.

DFP 320 will set the IRQREG[Packet Transfer IRQ] bit causing a MCU interrupt.

MCU 310 will read the IRQREG and because the Packet Transfer IRQ bit is set it will read the MINASTRREG.

MCU 310 will then write the data to MCU 310 DATA STREAM BUFFER, MCUBUFREG.

MCU 310 writes the stream number in MCU 310 INACTIVE STREAM REG, MINASTRREG. MCU 310 clears the interrupt by writing a 1 to the IRQREG [Packet Transfer IRQ] bit DFP to HW Blocks: Handshake Descriptions DFP 320 performs reads and writes to all the hardware blocks over a common bus. There are two type of data transfers between MCU 310 and the hardware blocks. These are direct reads/writes by MCU 310 and data flow via a programmed data stream. The addresses in the hardware block used for data streams are generally the data input and output registers. Each data input or output register should be able to handle a packet size appropriate for the needed data bandwidth. This packet length, in number of 16 bit words, needs to be specified and is used by software. When a hardware block acknowledges a read or write cycle with the ARDY signal, it must drive or receive the entire packet without additional wait cycles. Each hardware block could have many input and output buffer lengths by specifying programmability in the control register.

When DFP 320 begins a write cycle to a HW block address, the HW block will decode the address and assert the ARDY signal. The HW block will then latch the data on the next cycle.

When DFP 320 begins a read cycle to an address, the HW block will assert ARDY to drive the data and complete the cycle.

Data Streams to/from Hardware Blocks

DFP 320 acts as the bus master, however, each hardware block can request the flow of data to the block through request lines to DFP 320. Each hardware block has one request signal for each DFP address in the block that can be used as a source or destination of a data stream. The following list is the handshake sequence for DFP 320 to hardware blocks.

DFP 320 must be programmed for all the data streams to/from a hardware block before the block processing is started. This includes writing the stream number to the HW REQUEST STEAM # register, HRQ<0-31 >REG. This maps each request signal to a data stream number.

The block begins processing when the START bit is written in the control register of the hardware block.

Any time the buffer at the data input address is completely empty or the buffer at the data output address is completely full, the request line for that address is asserted. This causes DFP 320 to service this stream. The request line should stay asserted until a read or write to the address is decoded and the ARDY is given. The request should go low before the end of the cycle.

DFP 320 will service the data stream by reading or writing a packet of data to DFP 320 address associated with the detected request line.

For data out, DFP 320 will read the source address programmed for the stream number written to the request's HRQ<0-31>REG. DFP 320 will write the data to an internal buffer in the stream processor 500.

For data in, DFP 320 will get the data and write it to the stream processor 500 buffer and then write the data to the destination address programmed for the stream number written in the request's HRQ<0-31>REG.

The hardware block will continue until the START bit is turned off or finishes. This can be configured for each function.

The above description is for a typical data stream where the stream source and destination addresses are programmed in DFP 320. In some cases, particularly for the sub-frame timing block, a single address will be a source for a data stream but the destination may vary. For this case, DFP 320 can be programmed to process a destination-less stream. This is done be writing 0xFFFF to the destination address. When DFP 320 processes this stream, it will use the first 2 bytes of the data as the destination address. This allows the sub-frame timing block to be programmed and talk to all valid DFP addresses without significant control. For this case, the above list of events are still valid.

DFP Data Stream Processing Functions

This part describes data streams are processed. While the above parts covered just the hardware interface, this part lists details of all the blocks for some data stream examples.

Data Streams Between DFP and DSP

DFP Initiated Communication

1) DFP 320 tells DSP 300 that a DSP MEMORY BUFFER is needed for a particular data stream. DFP 320 will only cause an interrupt once when it determines that a buffer is needed. An inactive stream may exist because the stream was just programmed by MCU 310 and was not given a buffer address or the last DSP memory buffer has been completely written or read. When the stream is programmed, the source and destination of buffer addresses and block size is determined. DFP 320 can interrupt the host software or DSP 300 for new buffer addresses, as determined by the programmable registers for each data stream. DFP 320 tells DSP 300 that a stream is inactive with the following sequence DFP 320 detects an inactive stream (see Part (TBD) DATA BUFFERS for how this is done). It will complete a RAM access if one is in progress until the RAM bus is not requested.

DFP 320 writes the stream number in the INACTIVE STREAM # memory mapped register. The stream number and data memory address are given in Table (TBD).

DFP 320 will set the IRQ2 pin of DSP 300 high for 1 instruction cycle. The IRQ function should be programmed to be edge sensitive in DSP 300. Programming and edge sensitive IRQ also allows use of software interrupts via DSP 300 IFC register. DFP 320 will wait until DSP 300 IRQ2 routine is complete by waiting until it detects a 1=>0 transition on FO. During this time it will not request RAM access.

DSP 300 will read the INACTIVE STREAM # memory mapped register.

DSP 300 will, in general, read any other memory mapped registers at this time DSP 300 will determine if a new buffer is to be provided. If so, it will DSP 300 will set FO high and write the stream number to the STREAM NUMBER FOR MEMORY BUFFER register, write the 1st address of the new buffer to DSP 300 MEMORY BUFFER START ADDRESS register, and write the size of the buffer (in DSP memory words) to DSP 300 MEMOEY BUFFER SIZE register. If a new memory buffer is not to be provided write 0x0000 to the STREAM NUMBER FOR MEMORY BUFFER register.

the DSP will set FO low, FLAG OUT. This must be the last instructions in the IRQ2 routine before the return on interrupt, RTI. Refer to the Part (TBD), INTERRUPT AND STATUS CODFPNICATION for more discussion on the IRQ2 routine.

DFP 320 will latch the falling edge of FO, terminating the IRQ for the inactive stream. This will let DFP 320 know that DSP 300 has read the memory mapped register and possibly provided a new buffer.

DFP 320 will set FLAGIN, FI, high. This will be used by DSP 300 to keep from reading the memory mapped registers to provide another buffer until the address information from the last one has been read.

DFP 320 will read the STREAM NUMBER FOR MEMORY BUFFER register. If it is 0x0000, DFP 320 will assume a buffer has not been provided by DSP 300 and do nothing. If it is any value other than 0x0000, DFP 320 will read DSP 300 MEM BUF START ADDRESS and DSP MEMORY BUFFER SIZE memory mapped registers and update the stream process or with the new buffer information.

DFP 320 will set FI low and continue processing data streams.

2) DFP 320 may let DSP 300 know it has received DSP's 300 memory start address and DSP memory block size from DSP's 300 operation system software.

when DSP 300 wants to provide a buffer address data outside of the IRQ2 routine, it will set FO high as described below under DSP's 300 Initiated Communication. DSP 300 will write the stream buffer information to the memory mapped registers and set FO low.

DFP 320 will latch the falling edge of the FO signal and set FLAGIN, FI, high.

DFP 320 will read the STREAM NUMBER FOR MEMORY BUFFER, DSP MEMORY BUFFER START ADDR, and DSP MEMORY BUFFER SIZE memory mapped registers. This will cause this inactive stream to become active and DFP 320 will continue processing streams. There is no set time for DFP 320 to do this. DFP 320 will read the registers and re-activate the stream within one pass of checking the streams for status. If the stream was active, DFP 320 will use the new DSP memory buffer address to read or write data and set the bit corresponding to the stream number in the STREAMS TRANSFER STATUS register. This register is used for underflow or overflow error conditions. Providing a buffer address to an active stream would not be a normal function. If buffer information is provided for a stream that is 'off', DFP 320 will ignore the data.

DFP 320 will set FLAGIN low, FI, low once the buffer address data has been read.

DSP Initiated Communication
1) Let DFP 320 know DSP 300 has provided DSP 300 MEMORY START ADDRESS and DSP MEMORY BUFFER SIZE independently from the interrupt routine. DSP 300 may provide a buffer in the IRQ2 routine but this sequence describes when DSP 300 notifies DFP 320 that it has written a new buffer address outside the IRQ2 routine. It does this with the following sequence.

DSP 300 will set FO, FLAG OUT, high
  DSP 300 writes the stream number to the STREAM # FOR MEMORY BUFFER memory mapped register. The stream number and data register address are given in Table (TBD).
  DSP 300 writes the data memory or program memory start address in DSP 300 MEMORY BUFFER START ADDRESS whose address is given in Table (TBD).
  DSP 300 writes the data memory or program memory buffer size in DSP 300 MEMORY BUFFER SIZE whose address is given in Table (TBD).
DSP 300 will set FO, FLAG OUT, low
  DFP 320 will detect the falling edge of FO and set FI high while it reads the buffer data. When DFP 320 is done (as described above in DFP 320 Initiated Communication) it will set FI low.
  DSP 300 will wait until DFP 320 has read this data by checking FI, before it provides buffer address data for another stream.

HW ACC Data Flow to MCU 310

Data can get from the HW ACC by MCU reads of the HW ACC addresses or by data streams that are programmed by MCU 310. The direct reads are described above and would be used for programming registers in the hardware block. This part refers to the operation of data flow via a programmed data stream.

To setup a data stream to a hardware block, MCU 310 needs to write the address for the block's output data buffer to the STREAM BUFFER SOURCE ADDRESS and write the address for MCU 310 DATA STREAM BUFFER to the STREAM BUFFER DESTINATION ADDRESS register. MCU 310 also needs to program which hardware request signal will be used for the stream. This is done by writing the stream number to one of the STREAM NUMBERS FOR HW ACC REQUESTS, HRQ<0-31>REG. MCU 310 should write the STREAM CONTROL, SCTL, register last to turn on the data stream.

The following sequence describes data flow and DFP operation for data flow from a HW ACC to MCU.
  MCU 310 writes the stream number (to be programmed) to the STREAM NUMBERS FOR HW ACC REQUESTS, HRQ<0-31>REG, register. Each hardware request signal will be used for one address and would be part of the hardware spec.
  MCU 310 programs DFP 320 for a data stream which has the address of MCU 310 DATA STREAM BUFFER, MBUFSTRREG, in DFP 320 as a destination and the address of a data output register of a HW ACC as the source.
  MCU 310 programs the STREAM CONTROL, SCTL, registers.
  MCU 310 programs the hardware blocks control register (s). The function of the control register is very flexible. MCU 310 does need to start the hardware's function.
  DFP will keep track of the data stream's status.
    DFP 320 will consider the data stream inactive if the HRQ<0-31>REG is low or if DFP 320 has transferred the number of words programmed in the STREAM BUFFER SIZE, SSZ<1-31>, register.
    DFP 320 sets the stream active when the HRQ<>REG is high.
  When the HRQ<>REG for the HW ACC's output data address is high, DFP 320's stream processor 500 will read the address for the number of words in a packet programmed in the data stream's control register.
  DFP 320 will write the data into the stream processor 500 data buffer.
  DFP 320 will tally the number of words written and compare it to the data stream's buffer size.
    if the buffer size has not yet been transferred, DFP 320 continues
    if the buffer size is met. DFP 320 will continue transferring the data packet and interrupt DSP 300 or MCU as programmed by the SCTL[2] bit. For this stream this bit would normally be programmed to MCU 310.
  DFP 320 waits until MCU 310 buffer is empty (if it is being used) and then writes the data packet to MCU 310 buffer and the stream number into MCU 310 INACTIVE STREAM REG, MINASTRREG.
  DFP 320 sets the IRQREG[Packet IRQ] bit. This causes a MCU interrupt if IRQ[Packet IRQ ENA]=0.
  DFP 320 continues processing streams not involving MCU 310 until it needs MCU 310 buffer is free.
  In response to the interrupt, MCU 310 will read the IRQREG and find the Packet IRQ bit set.
  MCU 310 will read the MINASTRREG and use the stream number to identify the purpose of the data, the direction of data flow, and the # of words/packet.
  MCU 310 will then read MCU 310 BUFFER for 1 packet of data.
  MCU 310 will write a 1 to the IRQREG[Packet IRQ], servicing the interrupt.
  MCU 310 writes a 0 to the MINSTRREG to free MCU 310 buffer.

HW ACC Data Flow from MCU 310

To setup a data stream from a hardware block, MCU 310 needs to write the address for the block's input data buffer to the STREAM BUFFER DESTINATION ADDRESS and MCU 310 DATA STREAM BUFFER address to the STREAM BUFFER SOURCE ADDRESS register. MCU 310 also needs to program which hardware request signal is used for the stream. This is done by writing the stream number to one of the STREAM NUMBERS FOR HW ACC REQUESTS, HRQ<0-31>REG. MCU 310 should write the stream number to the HRQ<0-31>REG before writing to the STREAM CONTROL, SCTL, register to turn on the data stream.

The following sequence describes data flow and DFP operation for data flow from a HW ACC to MCU.
  MCU 310 writes the stream number (to be programmed) to the STREAM NUMBERS FOR HW ACC REQUESTS, HRQ<0-31>REG, register. Each hardware request signal will be used for one address and would be part of the hardware spec.
  MCU 310 programs DFP 320 for a data stream which has the address of MCU 310 DATA STREAM BUFFER, MBUFSTRREG, in DFP 320 as a source and the address of a data output register of a HW ACC as the destination.
  MCU 310 programs the STREAM CONTROL, SCTL, registers.
  DFP will keep track of the data stream's status.

DFP 320 will consider the data stream inactive if the HRQ<>REG is low or if DFP 320 has transferred the number of words programmed in the STREAM BUFFER SIZE, SSZ<1-31>, register.

DFP 320 sets the stream active when the HRQ<>REG is high.

When the HRQ<>REG for the HW ACC's input data address is high, DFP 320's stream processor 500 will wait until MCU 310 DATA STREAM BUFFER is empty (if necessary) and write the stream number to the MINASTRREG. Note that the average data rate is controlled by the hardware accelerator.

DFP 320 will interrupt MCU 310 by setting the IRQREG [Packet IRQ] bit. This causes a MCU interrupt if IRQ[Packet IRQ ENA]=0.

In response to the interrupt, MCU 310 will read the IRQREG and find the Packet IRQ bit set.

MCU 310 will read the MINASTRREG and use the stream number to identify the purpose of the data, the direction of data flow, and the # of words/packet.

MCU 310 will note that that stream number needs data and do 1 of 3 things
- MCU 310 may provide the data for the requested stream.
  - MCU 310 will write a packet of data for the stream to MCU 310BUFREG
  - MCU 310 will then clear the interrupt by writing a 1 to IRQ[Packet IRQ]
  - MCU 310 will then write the stream number to the MINASTRREG
- MCU 310 may provide data for a different stream number
  - MCU 310 will write a packet of data for the stream to MCU 310BUFREG
  - MCU 310 will then clear the interrupt by writing a 1 to IRQ[Packet IRQ]
  - MCU 310 will then write the stream number to the MINASTRREG
- MCU 310 could not provide data for any stream
  - MCU 310 will then clear the interrupt by writing a 1 to IRQ[Packet IRQ]
  - MCU 310 will then write 0 to the MINASTRREG DFP 320 will trigger that MCU 310 has completed using MCU 310 DATA STREAM BUFFER on the write to the MINASTRREG.

DFP 320 will get the stream number from the MINASTRREG and write the data to the destination address. If the stream number is 0, DFP 320 will continue processing data streams. If the stream number is different from the requested stream, DFP 320's stream processor 500 will put the stream in queue to have the data written to the proper address. The data will sit in the stream processor 500 internal buffer until the HRQ<>REG for the stream is active.

DFP 320's stream processor 500 will give priority MCU 310 W/R accesses to addresses in DFP 320's address space except for MCU 310 INTERFACE BUFFER address(es). DFP 320 will give an equal priority to all other data flow.

2.2.7 DFP Register Descriptions

DFP 320 address offset is given in FIG. 17. It uses the base address for DFP 320 internal registers given in FIG. 5.

2.2.7.1 Registers Located in DFP 320 Block
INTERRUPT REGISTER—IRQREG (Default: 'h0000)

| 15 | 14 | 13 | 12 | 11 | 10 | 9 | 8 |
|---|---|---|---|---|---|---|---|
| Reserved | Reserved | BP ENA | Reserved | Packet IRQ ENA | FL2 ENA | FL1 ENA | FL0 ENA |

| 7 | 6 | 5 | 4 | 3 | 2 | 1 | 0 |
|---|---|---|---|---|---|---|---|
| Reserved | Stream status IRQ | BP IRQ | Stream complete IRQ | Packet IRQ | DSP FL2 | DSP FL1 | DSP FL0 |

BP ENA—When this bit is high, a MCU interrupt will occur due to BPIRQ.

PACKET IRQ ENA—This bit masks MCU 310 interrupt signal from the Packet IRQ bit.

FL2 ENA—System level interrupt enable for Flag out 2. When high, DSP FL2 will cause a system interrupt.

FL1 ENA—System level interrupt enable for Flag out 1. When high, DSP FL1 will cause a system interrupt.

FL0 ENA—System level interrupt enable for Flag out 0. When high, DSP FL0 will cause a system interrupt.

STREAM STATUS IRQ—Interrupt caused by one of the bits in the stream status register, SSATREG. This interrupt must be serviced by clearing the bit causing the interrupt.

BP IRQ—This bit is asserted when the clock generator mode changes from non-frozen to frozen due to the DEBUG CONTROL register or a break point. This bit is cleared by writing a 1 to it or when the SS ENA or GO bits transition from 0=>1 in the DEBUG CONTROL register.

STREAM COMPLETE IRQ—Interrupt bit for MCU 310. Set by DFP 320, active high, to let MCU 310 know the complete buffer has been transferred for a data stream. This bit causes MCU 310 interrupt signal to go active.

PACKET IRQ—Interrupt bit for MCU 310. Set by DFP 320, active high, to let MCU 310 know a data stream needs a packet of data. This bit causes MCU 310 interrupt signal to go active unless masked by the Packet IRQ ENA bit.

DSP FL2—This is a read only bit. DSP's 300 Flag out 2, FL2, signal is mapped to this bit. Writing to this bit has no effect.

DSP FL1—This is a read only bit. DSP's 300 Flag out 1, FL1, signal is mapped to this bit. Writing to this bit has no effect.

DSP FL0—This is a read only bit. DSP's 300 Flag out 0, FL0, signal is mapped to this bit. Writing to this bit has no effect.

DFP CONTROL REGISTER—CTLREG[15:0] (Default: 'h0000)

| 15 | 14 | 13 | 12 | 11 | 10 | 9 | 8 |
|---|---|---|---|---|---|---|---|
| reserved | reserved | DSP FI | DSP FO | reserved | reserved | IRQ1 MUX | IRQ0 MUX |

-continued

| 7 | 6 | 5 | 4 | 3 | 2 | 1 | 0 |
|---|---|---|---|---|---|---|---|
| reserved | BGHW [2] | BGHW [1] | BGHW [0] | reserved | DSP IRQ2 | DSP IRQ1 | DSP IRQ0 |

This register is used for bus interface and 301 clocking control.

DSP FI—This bit is a read only bit. The bus interface output, FLAG IN, is mapped to this bit. Writing to this bit has no effect.

DSP FO—This bit is a read only bit. DSP 300 output, FLAG OUT, is mapped to this bit. Writing to this bit has no effect. IRQ2 MUX—This bit controls a mux for the IRQ2 input of DSP 300. When this bit is 0, the IRQ2 signal operates per the normal 2171 functions. When this bit is 1, the IRQ2 signal is controlled by DSP 300 IRQ2 bit in the 301 IRQREG. However, DFP 320 can not function normally because it can not cause an interrupt to DSP 300.

IRQ1 MUX—This bit controls a mux for the IRQ1 input of DSP 300. When this bit is 0, the IRQ1 signal operates per the normal 2171 functions. When this bit is 1, the IRQ1 signal is controlled by DSP 300 IRQ1 bit. However, the configuration state of the SPORT1 must be set to 0 for interrupts and flag mode, System Control Reg (ox3fff)[10]=0, for the IRQREG to act as an input.

IRQ0 MUX—This bit controls a mux for the IRQ0 input of DSP 300. When this bit is 0, the IRQ0 signal operates per the normal 2171 functions. When this bit is 1, the IRQ0 signal is controlled by DSP 300 IRQ0 bit. However, the configuration state of the SPORT1 must be set to 0 for interrupts and flag mode, System Control Reg (ox3fff)[10]=0, for the IRQREG to act as an input.

BGHW[2:0]—BGH wait time, in multiples of 32 instruction cycles, for DFP 320 to hold off requesting any block of the RAM after NBGH is asserted. Each bit of the wait time has weight of 32 instruction cycles giving the delay a range from 32–256 instruction cycles.

DSP IRQ2—Writing a 1 to this bit will interrupt DSP 300 for IRQ2. Writing a 0 cause the IRQ2 input to go low. DSP 300 must be programmed for edge sensitive interrupts per the bus interface operation. Therefore, this interrupt will be edge sensitive. This interrupt is normally used by DFP 320 for DSP 300 interface. When used DFP 320 should not be processing streams.

DSP IRQ1—This bit is muxed to the input of DSP 300 IRQ1 function when selected by CTLREG[7]. Writing a 1 to this bit will interrupt DSP 300 for IRQ1. Writing a 0 cause the IRQ1 input to go low. DSP 300 must be programmed for edge sensitive interrupts per the bus interface operation. Therefore, this interrupt will be edge sensitive. This interrupt is a function of the System Control register, the SPORT1 must be configured for interrupts and flags.

DSP IRQ0—This bit is muxed to the input of DSP 300 IRQ0 function when selected by CTLREG[7]. Writing a 1 to this bit will interrupt DSP 300 for IRQ0. Writing a 0 cause the IRQ0 input to go low. DSP 300 must be programmed for edge sensitive interrupts per the bus interface operation. Therefore, this interrupt will be edge sensitive. This interrupt is a function of the System Control register, the SPORT1 must be configured for interrupts and flags.

TEST REGISTER—TSTREG[7:0] (Default: 'h8000)

| 15 | 14 | 13 | 12 | 11 | 10 | 9 | 8 |
|---|---|---|---|---|---|---|---|
| RESET_L | SHUTDN | CLKOK | NBR REL | | | | |

| 7 | 6 | 5 | 4 | 3 | 2 | 1 | 0 |
|---|---|---|---|---|---|---|---|
| | DSP TEST PIN | PIN MUX CONTROL | | DFP SCAN | RAM BIST | RAM SCAN | TEST CLK ACCESS |

RESET_L—This bit is the software reset. Writing a 0 to this bit will perform a reset of DSP 300 & base band hardware except for MCU 310. For DSP 300, this bit is DSP 300 RESET_L bit located in the ADI 2171 HIP register space relocated to DFP 320 block. A 1=>0 transition will be latched by the main clock in signal directly from the pin and used to generate a reset pulse for the hardware. DSP 300 clock block is also reset using this method. The register is set back to a 1 after the reset is completed.

SHUTDN—When this bit is 1, it causes all base band HW except MCU 310 to enter the shut down low power state.

CLKOK—This bit is a read only bit. The clock generator signal, CLKOK, is mapped to this bit. It is used to start the clock generator. When CLKOK is low, the clock generator is not stable. When it is 1, the clock generator is stable and all clocks are present, depending on the other inputs to the clock generator block.

NBR REL—Bus request release. This bit reset to 0 and causes the data flow processor to assert bus request and hold it until a 1 is written to this bit. The NBR signal to DSP 300 is an OR of this bit and the normal NBR output from the bus interface control.

DSP TEST PIN—enables DSP 300 test mode

PIN MUX CONTROL—controls pins muxed for observability of the embedded DSP

DFP SCAN—Scan enable for DFP 320

RAM BIST—self test for DSP 300 RAMs

RAM SCAN—boundary scan for RAM

TEST CLK ACCESS—enable for direct control of clocks

MCU DATA STREAM BUFFER REGISTER—MCUBUFREG[15:0]—N Words Deep

| 15:0 |
|---|
| DATA[15:0] |

DFP 320 uses a buffer to MCU 310 for all data streams. This buffer allows DFP 320-MCU data transfer to handle clock differences and keeps DFP 320 processing from slowing down MCU W/R accesses. The depth of the buffer will depend on the particular design. The depth of the buffer will effect the overhead and bandwidth of MCU 310/DFP interface.

DATA[15:0]—Data for data streams to/from MCU 310. The stream number is given in the INACTIVE STREAM NUMBER register and read by MCU 310.

MINACTIVE STREAM #—INASTRREG[15:0] (Default: 'h0000)

| 15:5 | 4:0 |
|---|---|
| Reserved | INASTR# |

MINASTR#—Used for transferring data stream numbers between MCU 310 and DFP. This is used by MCU 310 to provide the STREAM # to DFP 320 for a data stream that has requested a packet of data. This register is written by MCU 310 and read by DFP 320. DFP 320 triggers off the write to this register to interrupt MCU 310 and aMCU 310 can write to this register

DEBUG CONTROL—DBCTL[15:0]

| 15 | 14:8 |   |   |   |   |   |   |
|---|---|---|---|---|---|---|---|
| SS ENA | SS COUNT |   |   |   |   |   |   |

| 7 | 6 | 5 | 4 | 3 | 2 | 1 | 0 |
|---|---|---|---|---|---|---|---|
| BP1L[2] | BP1L[1] | BP1L[0] | BP2L[2] | BP2L[1] | BP2L[0] | GO | FREEZE |

SS ENA—Single Step ENAble. When 1 the bus interface will allow the clock generator to run for SS COUNT cycles and stop it with the FREEZE bit. The clock should be frozen before this is enabled. When the SS COUNT is reached, this bit is cleared.

SS COUNT—Single Step COUNT. When SS ENA is written the bus interface will remove FREEZE for this number of instruction cycles. If a break point occurs first, the FREEZE will be asserted on the break point.

BP1L[2-0]—Break Point 1 Loop. Each time a break point field is enabled, the bus interface will loop on the break point condition before asserting FREEZE and removing the BP(1 or 2) ENA.

BP2L[2-0]—Break Point 2 Loop. Each time a break point field is enabled, the bus interface will loop on the break point condition before asserting FREEZE and removing the BP(1 or 2) ENA.

GO—Writing a 1 to this bit causes the bus interface to remove FREEZE if it was asserted from a debug mode. If FREEZE is asserted because of SHUT DOWN or POWER DOWN, FREEZE will not be removed.

FREEZE—This is a read only. The bus interface FREEZE output to the clock generator is mapped to this bit

BREAK POINT FIELD 1 CONTROL—BPF1 [7:0]

| 7 | 6 | 5 | 4 | 3 | 2 | 1 | 0 |
|---|---|---|---|---|---|---|---|
| BG | W | R | FO gate | FO | FL gate | FL1 | FL0 |

BG—bus grant. If high, the bus grant should be active which means the bus interface is currently accessing the address. If bus grant is low, DSP 300 is accessing the current RAM address.

W—High for a break on a write.

R—High for a break on a read.

FL gate—High when the break should occur only on Flag Out. Otherwise the first event, RAM access or Flag Out will cause the break point.

FL1—High for a break on Flag Out. Flag Out is asserted when DSP 300 exits the IRQ2 routine.

FL gate—High when the break should occur only on Flag Out 1 or 0. Otherwise the first event, RAM access or Flag Out will cause the break point.

FL1—High for a break on Flag Out 1.

FL0—High for a break on Flag Out 0.

BREAK POINT FIELD 1 ADDRESS—BPFA1[15:0]

| 15 | 14:8 |
|---|---|
| BP ENA | ADDR[14:8] |

| 7:0 |
|---|
| ADDR[7:0] |

BP ENA—Enables the break point. The bus interface will clear this bit when the break point is met after the break point loop is counted down.

ADDR[14:0]—DSP memory address, program and data.

BREAK POINT FIELD 2 CONTROL—BPF2[7:0]
Identical to break point field 1.

BREAK POINT FIELD 2 ADDRESS—BPFA2[15:0]
Identical to break point field 1.

BREAK POINT FIELD 3 CONTROL—BPF3[7:0]
Identical to break point field 1 except there is no break point looping.

BREAK POINT FIELD 3 ADDRESS—BPFA3[15:0]
Identical to break point field 1 except there is no break point looping.

STREAM[15:0] TRANSFER STATUS—SSTATREG [15:0] (Default: 'h0000) memory mapped

This register is for reporting overflow and underflow errors in the data stream flow. Any bit set high in this register causes the IRQ[6] to be set. Each STREAM # for streams 15–0 are mapped to the bits of the registers. The bits are set by DFP 320 and cleared by host software writes. When DFP 320 is processing an active stream and data overflows or underflows, it will set the bit corresponding to the STREAM #. Since streams are unidirectional only one condition, underflow or overflow, is likely for each data stream.

STREAM[31:16] TRANSFER STATUS—SSTATREG [31:16] (Default: 'h0000) memory mapped

This register is for reporting overflow and underflow errors in the data stream flow for STREAM #s 31–16. Any bit set high in this register causes the IRQREG[6] to be set. The bits are set by DFP 320 and cleared by host software writes.

STREAM NUMBERS FOR HW ACC REQUESTS—HRQ [0-31]REG

|   | 4:0 |
|---|---|
|   | STR[4:0] |

This set of registers is used to program each data stream service request line from a hardware block to one of the stream numbers. For this specification there are 32 request lines. The actual number would depend on the design. This register is written once when each stream is programmed that involves a data stream to a hardware block.

STR[4:0]—Stream number. One of the stream numbers known to the stream processor 500. For this specification, 0-31. The stream number written to a particular hardware accelerator block's request line would be the stream number programmed to use that address as a source or destination for data flow.

Registers Mapped to DSP Data Memory

INACTIVE STREAM #—INASTRREG[15:0] (Default: 'h0000)

| 15:5 | 4:0 |
|---|---|
| Reserved | INASTR# |

INASTR#—Used for transferring data stream numbers between DFP 320 and DSP. This is used by DFP 320 to provide the STREAM # to DSP 300 for a data stream that is gone inactive. This register is written by DFP 320 and read by DSP 300 during the IRQ2 routine. This register is also used by DSP 300 to provide a stream number to DFP 320 when providing a data stream buffer start address (as the source or destination) in STREAM BUFFER SOURCE ADDRESS, SA and the buffer size in STREAM BUFFER SIZE, SSZ.

STREAM BUFFER SIZE—SSZ[15:0] (Default: 'h0000)

| 15:14 | 13:0 |
|---|---|
| Reserved | SSZ |

SSZ—This register is used to set the data stream buffer size for DFP 320. It can be written by DSP's 300 software and read by DFP 320 from DSP data memory and copied to the proper DFP register, SA<1-31>, depending on the stream number given in INASTR-REG. DSP 300 also writes the stream number for the size in the inactive stream number register, INASTR-REG. This register and the STREAM BUFFER SOURCE ADDRESS are always used together. The range for DSP's 300 memory buffer size is 0K–16K.

STREAM BUFFER SOURCE ADDRESS—SA[15:0] (Default: 'h0000)

| 15:0 |
|---|
| SA |

SA—This register is used to set DSP's 300 memory buffer address for DFP 320. It is written by DSP's 300 software and read by DFP 320 from DSP data memory and copied to the proper DFP register, SA<1-31>, depending on the stream number given in INASTR-REG. DSP 300 will write the starting address of DSP's 300 data memory buffer to this register. DFP 320 will use the direction bit in the STREAM CONTROL register, SCTRL[3] to copy the value to the stream's source or destination address. Bits 15 & 14 are used to determine which DSP memory is being addressed. See part on RAM addressing by DFP 320.

DFP Data Stream Control Registers

DFP 320 can handle 31 data streams as described in this specification. Each data stream is programmed by MCU 310 or host controller for start up and control functions. The source or destination address may be supplied by DSP's 300 software. Since the data streams can operate simultaneously, one set of control registers below exist for each possible data stream. These registers exist in DFP 320 block.

STREAM CONTROL—SCTL[15:0] (Default: 'h0000).

| 15:13 | 12:8 | | | | |
|---|---|---|---|---|---|
| | Packet Size[4:0] | | | | |
| 7:5 | 4 | 3 | 2 | 1 | 0 |
| | SX | DIR | HOST/DSP BUF INT | HOST/DSP START | STREAM ON |

PACKET SIZE[4:0]—Number of 16 bit words transferred by DFP 320 in the data stream at a time. For data to and from MCU 310, this number should not exceed MCU 310 BUFFER size (32). For hardware blocks, this number should equal the size of the data buffered for each read or write access.

PACK—for use with the program memory only. When Pack=1, the 24 bit data is packed to be transferred in 4 bytes. When Pack=0 the program memory data is either zero padded or sign extended depending on bit [6].

SX—sign extension. When this bit is 1, a 16 bit word is sign extended to 32 bits. When this bit is 0, the valid word should be zero padded on the msbs to form a 32 bit word.

DIR—The data stream direction when the stream involves DSP 300. When this bit is 1, DSP 300 is the source of the stream. A 0 when DSP 300 is the destination.

HOST/DSP BUF INT—host/DSP memory buffer interrupt. When this bit is 1, DFP 320 will cause an interrupt to MCU 310 when the current memory address generated by the buffer interface has met DSP 300 memory start address+DSP memory buffer size. When the bit is 0, the buffer interface will interrupt DSP 300 for a new start address and memory buffer size.

HOST/DSP START—When this bit is 1, DSP 300 Memory Start Address and DSP Memory Buffer Size fields are valid. When the bit is 0, DFP 320 should proceed to get DSP 300 memory start address from DSP 300 when the STREAM ON bit transistions from 0=>1. Until DFP 320 gets a valid DSP Memory Start Address and DSP Memory Buffer Size, the data stream is considered inactive.

STREAM ON—This bit must be set high to cause the stream processor 500 to control whether the state of the data stream is in-active or active. This bit should be cleared to turn the stream off. However, a stream that has become inactive will not cause and processing cycles and does not have to be turned off.

STREAM SOURCE ADDRESS—SSA<1-31>[15:0] (Default: 'h00)

| 15:0 |
|---|
| SOURCE STRT ADDR[15:0] |

SOURCE STRT ADDR[15:0]—Stream's source start address. This value is used by DFP 320 as a starting address for writing or reading data to the source of the data stream, depending on the address. The stream processor 500 increments the address for each transfer of a word to or from DSP 300 memory. For addresses to the hardware accelerator's space, DFP 320 will not increment the address while transferring data. The last data transfers for a data stream occurs when the address is equal to DSP 300 memory start address+DSP memory buffer size. When this happens, DFP 320 causes an interrupt to the host or DSP 300, depending on the SCTL[2] bit in the STREAM CONTROL register, SCTL.

STREAM DESTINATION ADDRESS—SDA<1-31>[15:0] (Default: 'h00)

| 15:0 |
|---|
| DESTINATION STRT ADDR[15:0] |

DESTINATION STRT ADDR[15:0]—DSP memory start address. This value is used by DFP 320 as a starting address for writing or reading data to the destination of the data stream. The stream processor 500 increments the address for each transfer of a word to or from DSP memory. For addresses to the hardware accelerator's space, DFP 320 will not increment the address while transferring data. The last data transfers for the data stream occurs when the address is equal to DSP 300 memory start address+DSP memory buffer size. When this happens, DFP 320 causes an interrupt to the host or DSP 300, depending on the SCTL[2] bit in the STREAM CONTROL register, SCTL.

STREAM BUFFER SIZE—SSZ<1-31>[15:0] (Default: 'h00)

| 15:0 |
|---|
| STREAM # BUF SIZE[15:0] |

STREAM # BUF SIZE[15:0]—data stream buffer size, in words, for stopping the initiation of additional data transfers between the source and destination addresses. DFP 320 will use the source and destination start addresses and this buffer size to generate addresses for data transfers. The START ADDRESS+BUFFER SIZE is the last address for the current memory buffer. When this address is reached, DFP will cause an interrupt to the host or DSP 300, depending on the SCTL[2] bit in the STREAM CONTROL register.

Hardware Accelerator Functions

Hardware accelerator (HW ACC) functions are hardware blocks designed to do a specific operation or several operations, based on accessible configuration registers. Functions typically accelerated are those that are implemented more efficiently in specific hardware than as DSP firmware. All accelerated functions interface with DFP 320 to send and receive data on a common bus. DFP 320 is the bus master for the HW ACC bus. The HW ACCs can be accessed using DFP 320 by reads and writes or data streams. The control of the HW ACC block is done through data reads and writes to registers in each hardware accelerator. The signal interface between the HW ACC block and DFP 320 is used for bus control only. Each HW ACC will begin an operation when the START bit in the control register is written high. Starting of the accelerator can come from any of DFP 320 input sources and is directed to the particular accelerator using the address of its control register. The input data and output data of the accelerated function will typically use the data memory associated with DSP 300 as buffers but could use other valid addresses within DFP 320 address space. Although the HW ACC block is a slave on the bus, it is responsible for controlling the data rate for input and output data in both directions through two signals to DFP 320. DFP 320 function provides data flow to and from the HW ACC through a data stream at the pace of the accelerator's processing. The HW ACC's clock may be run at a different rate than DFP 320.

Data Flow—for Hardware Accelerator Functions

The HW block may be programmed to perform one task or a series of similar tasks based on the configuration register. The unused bits in the HxCTLREG can be used for HW ACC mode control. Before a task is started on a hardware accelerator block, DFP 320 needs to have the data streams programmed for the data flow to and from the HW ACC block.

Once DFP 320 has data streams programmed for the input data and output data registers, the HW ACC control register can be started by writing a 1 to the START bit. The HW ACC will begin processing a task. Each HW ACC will have input and output registers to buffer the data for reads and writes. The size of these HW ACC bus buffers will depend on the data needs of each accelerator. The size of the buffer will be used by the software on MCU 310 to program the data stream buffer size. When DFP 320 receives ARDY, it will expect to write or read to each HW ACC as many words as programmed in the data stream buffer size for the data stream. The size can be adjusted for each HW ACC to control the data throughput and overhead of the data transfers.

When the HW ACC input buffer is empty, the request signal for the input data buffer, REQ_HW#, is asserted. DFP 320's stream processor 500 will eventually perform a write to the HW ACC# 's input data address. When the HW ACC# is ready for the write cycle, it pulls down the ARDY signal. DFP 320 will write the number of bytes programmed in the data stream in one write cycle.

When the HW ACC output buffer is full, the request signal for the output data buffer, REQ_HW##, is asserted. DFP 320 will perform a read of the HW ACC#'s output data address. When the HW ACC# is ready to complete the entire read cycle, it pulls down the ARDY signal. DFP 320 will read the number of bytes programmed in the data stream in one read cycle.

DFP 320 will handle direct read or writes to the HW ACC#'s data addresses. This can even be done while a stream is programmed to the same address. Each hardware block can be designed to have as many control, data input, and data output registers as needed.

HW ACCEL #1 CTRL REG—H1CTLREG

| 15 | 14 | 13 | 12 | 11 | 10 | 9 | 8 |
|---|---|---|---|---|---|---|---|
| Re-served | Re-served | Re-served | Re-served | Re-served | Re-served | Re-served | Re-served |

| 7 | 6 | 5 | 4 | 3 | 2 | 1 | 0 |
|---|---|---|---|---|---|---|---|
| Re-served | Re-served | Re-served | Re-served | Re-served | com-pleted | start | reset |

RESET—When high, performs a soft reset of the block. Reset is removed by writing a 0.

START—When high, indicates that the block should start processing. The previous task must complete before writing a 1 to START. Reset can be used to stop the previous task if it is in progress and must be stopped. Writes to START will be ignored if task processing is in progress. When a task completes, the COMPLETE bit is set and the START bit is cleared by the HW ACC. The COMPLETED bit=1 will not prevent a start, but a task in progress will.

COMPLETED—When high, indicates that the block has completed processing. START bit is reset to 0 on the 0=>1 transition. COMPLETED is reset to 0 on the next read of this address. This register does not have to be read to clear the COMPLETED bit prior to starting a task due to a write to START. The COMPLETED bit=1 will not prevent a start, but a task in progress will.

HW ACCEL #1 DATA REG—H1DINREG

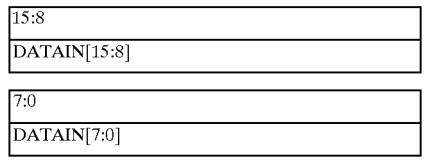

DATAIN—Input data for processing. Data is written to this address by DFP 320. This address needs to be specified for the buffer size, in words, in the device specification. This number is used to program DFP 320 for the data stream buffer size. Once the ARDY signal is active following a write to this address, DFP 320 will write the complete buffer size programmed in one write cycle.

HW ACCEL #1 DATA REG—H1DOUTREG

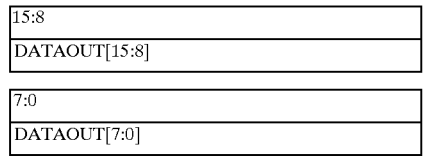

DATAOUT—Output data for processing. Data is read form this address by DFP 320. This address needs to be specified for the buffer size, in words, in the device specification. This number is used to program DFP 320 for the data stream buffer size. Once the ARDY signal is active following a read to this address, DFP 320 will read the complete buffer size programmed in one read cycle.

Hardware Accelerator Functions—Interface Signals to DFP

ADDR_DATA[7:0]—address and data bus, bidirectional. All addresses are two bytes long, sent lower byte first. The data is formatted by DFP 320 to 16 bit words for transfer to any other block.

ARD—Accelerator bus ReaD, DFP output. DFP 320 will cause the ARD to go inactive during the last data byte. The number of words transferred depends on the SCTL [Packet size].

AWR—Accelerator bus WRite, DFP output. DFP 320 drives the AWR signal inactive during the last data byte.

ARDY_L—Accelerator bus ReaDY, common HW ACC output. Each HW ACC will pull down the ARDY signal when the address has been decoded and the particular HW ACC block is ready to complete the read or write cycle. The ARDY should go inactive during the 1$^{st}$ data byte.

RQ_HWx—Request signal, one for each data stream to the HW ACC block. The request signal is used by the HW ACC to control data flow of a data stream. Each HW ACC has at least one input data register and one output data register. Data flow to these registers will typically be through data streams. The HW ACC will use the request signal when data reads or writes are needed for processing. The RQ_HWx pin must stay active until the ARDY has been asserted.

Figure 18:
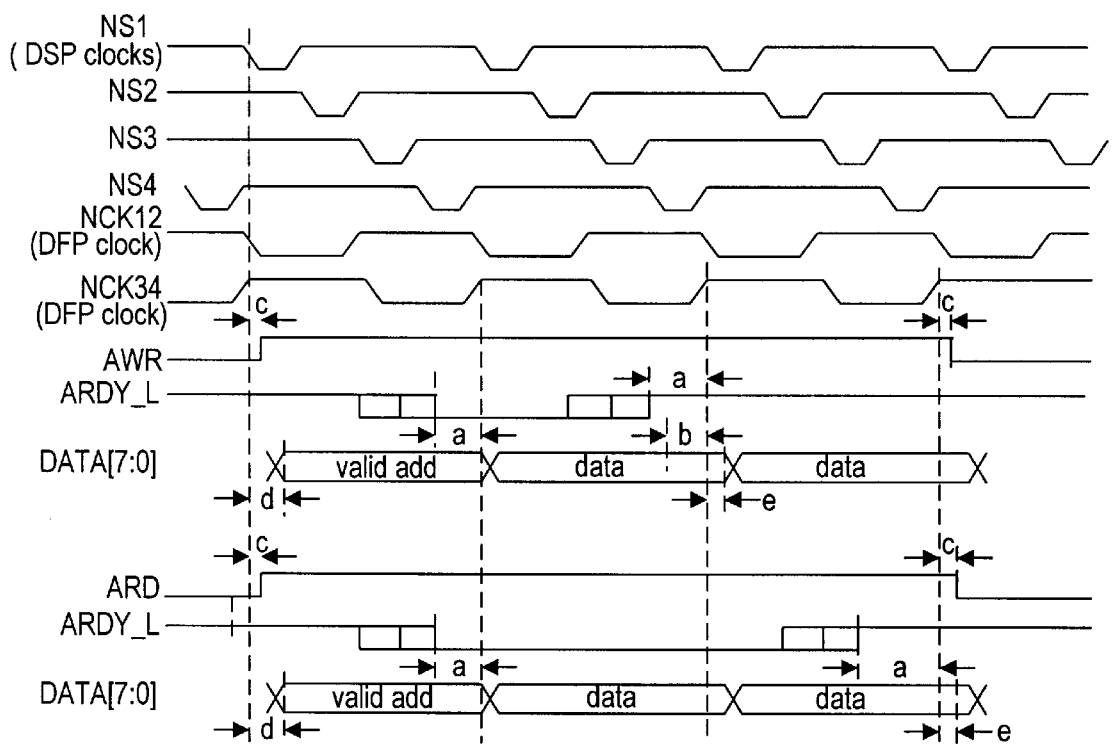
FIG. 18 shows the HW Accelerator-DFP interface.

The HW Accelerator—DFP interface is shown in FIG. 18.

Timer

General Description

The timer performs the hardware timing functions for the baseband and analog IF and RF functions. The timer model for the platform will be used to simulate the programming of the ¼ bit counter in a GSM system by MCU 310 and to control scheduling.

GSM TDMA Counter

The TDMA counter has an octal bit resolution. This results is a counter that overflows at 10,000. 156.25 bits/timeslot*8 timeslots/frame=1,250 bits/frame, 1250 bits*8 timer counts/bit=10,000 timer counts/frame. The overflow of the TDMA counter is programmable and has a range of 9998 to 19998. This range is equivalent to 1 frame—¼ bit to 2 frames—¼ bit. The timer should output a signal on the FRAME pin at the programmable count in FRMPOSREG. This will sync MCU 310 through a secondary interrupt to the TDMA frame counter.

The counter will reset at count 0 and increment to the count given in the overflow register. The counter for the current model does not be loaded from MCU 310.

Baseband Programming

The timer contains 31 sets of event registers for programming tasks off the TDMA timer. MCU 310 will write to the address of the EPROGREG to provide information for each event. The following data is needed to program an event. Each is sent in a 16 bit word:

16 bit source address of the sending task 16 bit destination address which the message data will be written to when the count is reached in the next frame 16 bits of message data that will be written to the address above 16 bit TMDA count for when the message data will be sent As each event is programmed, the timer will use the next available set of event registers. Since MCU 310 does not know if an event previously programmed has occurred, it does not directly address the registers storing the event data. All events are programmed to a common address, EPROGREG. The timer will store the data associated with each event and reuse the event registers as necessary. If the timer's event registers are full, it will return the destination address, message data, TMDA count, and control word to the sending task's source address. The timer block will interface to DFP 320 via the HW ACCEL bus. The bus transfers 16 bit data on an 8 bit bus.

Operation

The timer will have to compare the counts for each of the tasks programmed against the TDMA counter. As each event count is reached, the timer will perform two types of event triggers. One is to send data over the hardware accelerator bus. The other is to provide a direct signal from block to block. To send data, the timer will retrieve the data sent for the event during programming and send the destination address and data using a DFP read cycle of the data output register, DATAOREG. The timer will drive the destination address and data programmed for the event onto the hardware accelerator bus. For events that have a direct output, such as the FRAME signal, a 1 bit wide pulse will be output on the signal. Each of the direct outputs have their own address and register to program the TDMA count.

Block Signals

| | |
|---|---|
| Data (7:0) | I/O - 8 bits for address and data |
| ARD | IN - accelerator bus read |
| AWR | IN - accelerator bus write |
| ARDY_L | OUT - accelerator bus ready SFT has decoded the address and is ready to complete the cycle. |
| FRAME | OUT - 1 bit wide pulse, positive edge occurs at count loaded in FRMPOSREG |
| REQ_TMR | OUT - request for DFP 320 to read the data out register) DATAOREG. |
| TIMBR_OUT1 | OUT - 1 bit wide pulse, positive edge occurs at the count loaded on a programmed event. |
| TIMER_OUT2 | OUT - 1 bit wide pulse, positive edge occurs at the count loaded on a programmed event. |

Figure 19:
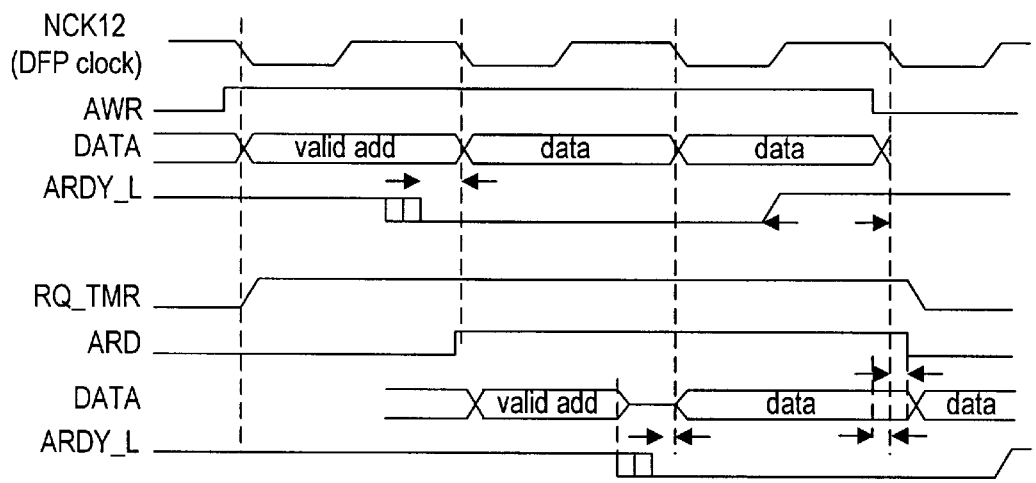
FIG. 19 shows the DFP-SFT interface.

The MMU-SFT interface is shown in FIG. 19.

Timer Registers

Tdma OverFlow REGister—TOFREG[14:0] (Default: 'h1388) Write/Read

Starts at 10,000 on reset. This controls the overflow point for the TDMA counter. The TDMA counter should roll over when reaching this count. This register can be programmed for counts from 0–19998. The register is used to control the overflow adjustment by programming 9998 or 10002 for ±¼ bit adjustments.

FRaMe POSition REGister—FRMPOSREG[14:0] (Default: 'h00) Write/Read

Sets the position of the frame pulse on the FRAME pin. The frame position will be loaded with a value from 0–10000. The rising edge of FRAME should occur when the TDMA counter and the FRMPOSREG are equal.

OUT1 POSition REGister—OUT1POSREG[14:0] (Default: 'h00) Write/Read

Sets the position of the OUT1 pulse on the TIMER_OUT1 pin. The position will be loaded with a value from 0–10000. The rising edge of TIMER_OUT1 should occur when the TDMA counter and the OUT1POSREG are equal.

OUT2 POSition REGister—OUT2POSREG[14:0] (Default: 'h00) Write/Read

Sets the position of the OUT2 pulse on the TIMER_OUT2 pin. The position will be loaded with a value from 0–10000. The rising edge of TIMER_OUT2 should occur when the TDMA counter and the OUT2POSREG are equal.

Event PROGram REGister—EPROGREG[15:0] (Default: 'h00) Write only

Tasks programmed off a count in the TDMA timer are written to this register. The following data values are written in order to this register is a single write cycle. Each data value is sent in 2 bytes.

16 bit source address of the sending task 16 bit destination address which the message data will be written to when the count is reached in the next frame 16 bits of message data that will be written to the address above 16 bit TMDA count for when the data will be sent. All programmed timing events will be at counts less than10,000. Only one event can be programmed per TMDA count value.

DATA Output REGister—DATAOREG[15:0] (Default: 'h00) Read only

This register is read by DFP 320 when the REQ pin is active. The timer will provide the $2^{nd}$ and $3^{rd}$ words of data written when the event was programmed during the read cycle. Each data value will be provided as a 16 bit word according to the HW ACCEL bus of DFP 320.

Software OS Functions

DSP 300 contains two main routines for controlling the operation of algorithms and interface. The interrupt routine interfaces to DFP 320 and performs handshaking to transfer control of W/R to DFP 320 control registers memory mapped in DSP data memory. The interrupt routine is designed to execute quickly transferring information to DFP 320. The interrupt routine should be about 100 instructions and run <100 cycles average per interrupt.

DSP Interrupt Routine

Figure 20:
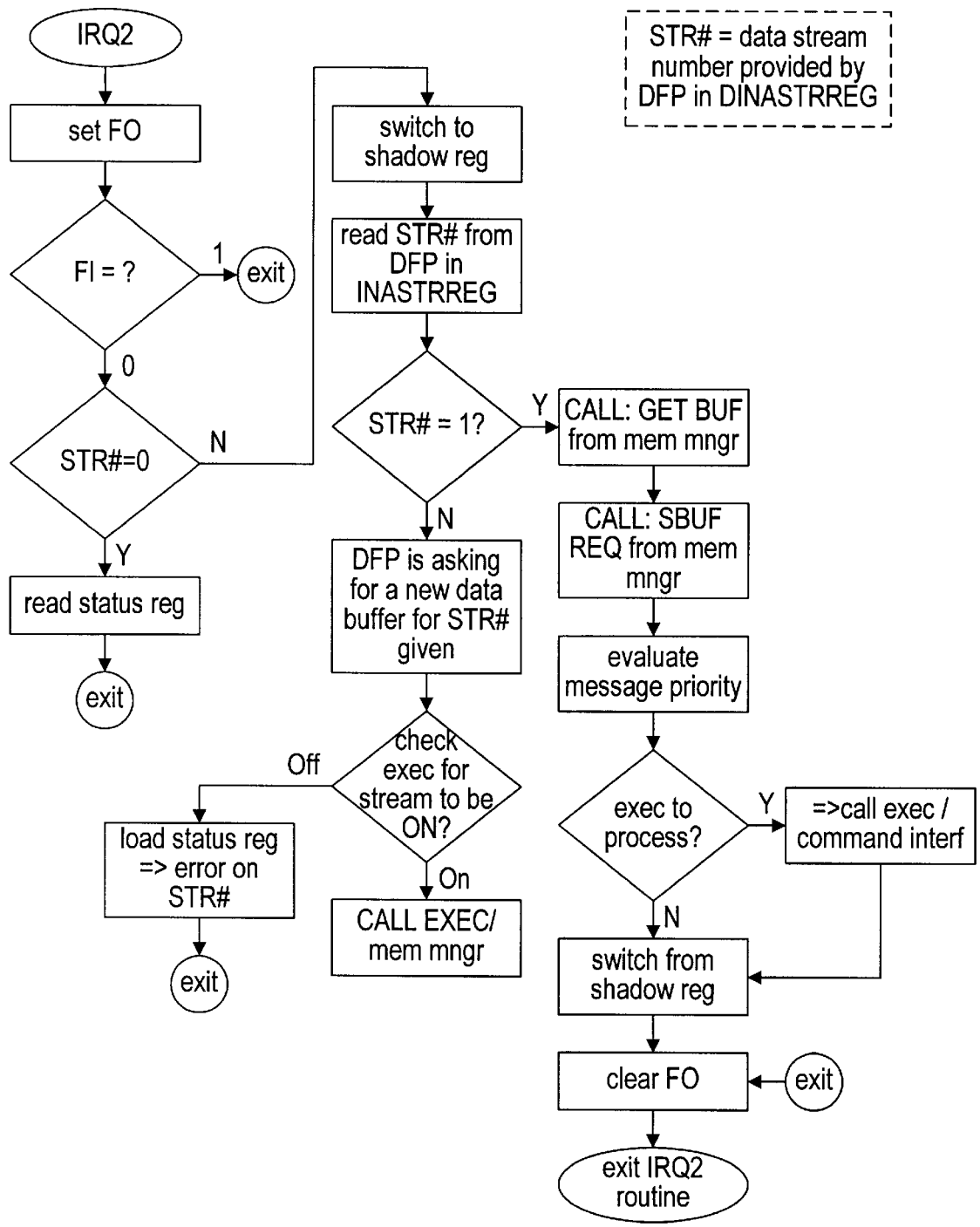
FIG. 20 shows a flowchart of the IRQ2 Routine.

A simple flow chart of the IRQ2 routine is given in FIG. 20.

DSP Executive Routine

Figure 21:
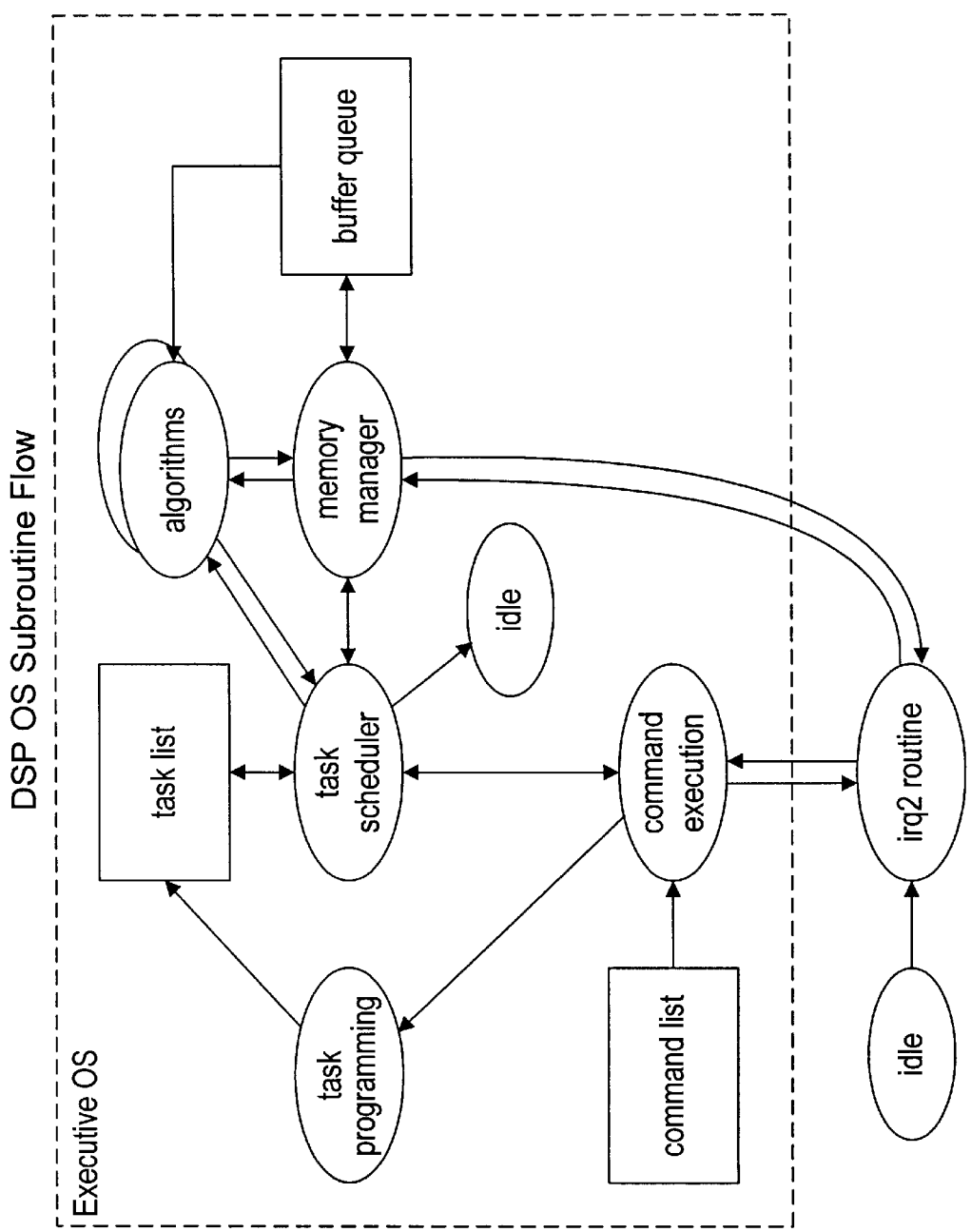
FIG. 21 shows a flowchart of the DSP OS subroutine.

The executive (EXEC) routine has several sub-routines that perform memory management of data buffers used in the task schedule, execution of the task schedule from a task list, and execution of commands. The interaction of the interrupt and EXEC sub-routines in the OS are shown in FIG. 21. The flow charts for the individual EXEC subroutines are shown FIG. 22–FIG. 25.

DSP Exec—Memory Manager Subroutine

Memory Manager

The memory manager keeps track of all the buffers for data streams. Buffers in DSP data memory for algorithms will have predetermined addresses. The memory manager interfaces with DFP 320 and the task scheduler routine, through the buffer queue, to transfer data memory buffers. The memory manager will handle up to two buffers per data stream for double buffering.

The memory manager will handle data buffers on stream number 1 differently. This stream number is intended for commands to DSP 300. As DFP 320 requests another buffer for stream 1, which means the previous one has data in it, the memory manager needs to always provide another buffer to allow a smooth flow of commands. Stream 1 buffers may not be executed until later by the executive routines. This is different than data buffers for stream numbers 2–31. In these cases, a buffer may not be immediately available to DFP 320 until a task executes. For stream 1 buffers, the memory manager has to find (from a specified address space) and allocate a new buffer. It must also return buffer addresses that are made available by the executive routines as the commands are executed.

Figure 22:
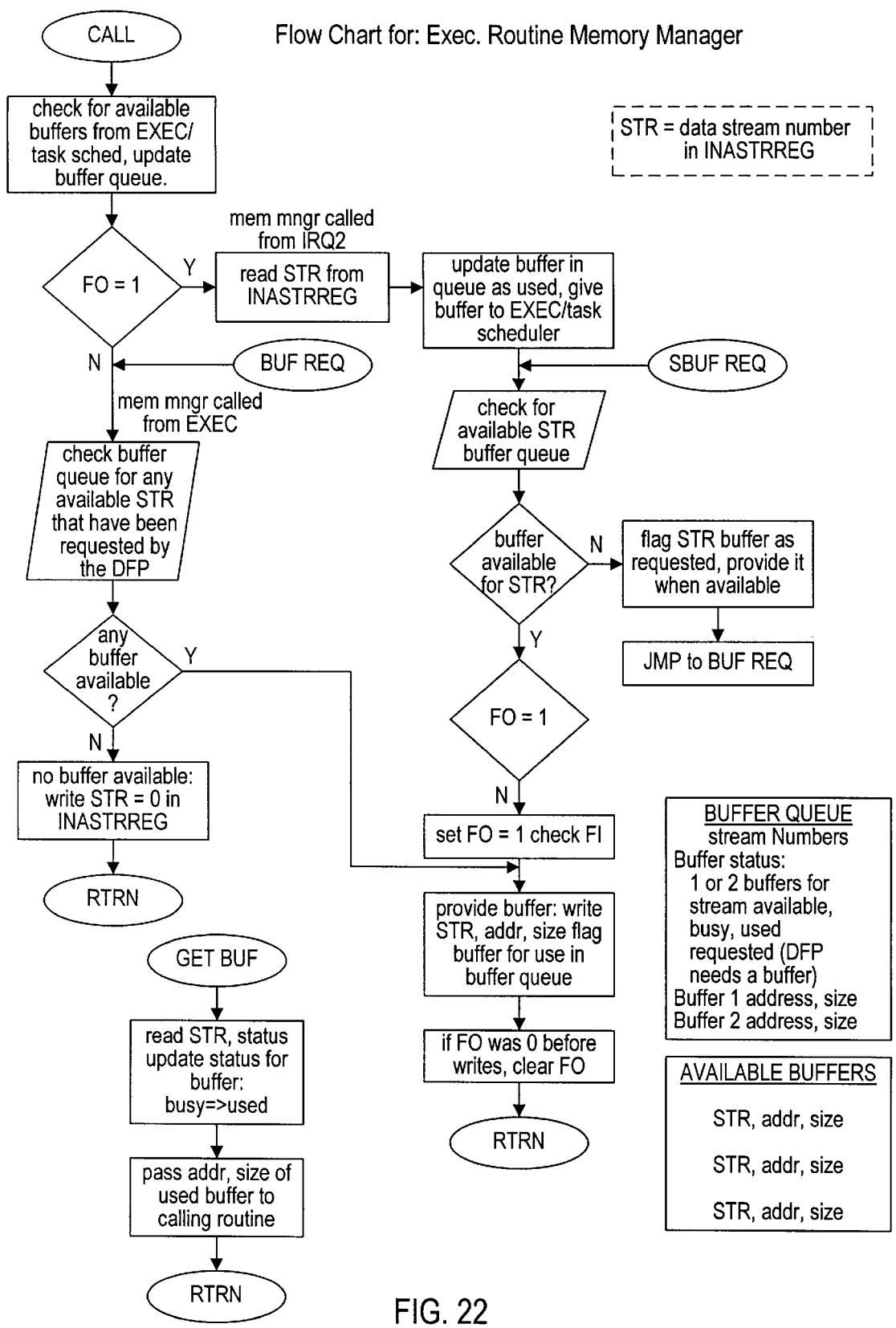
FIG. 22 shows a flowchart of the EXEC routine memory manager.
Figure 23:
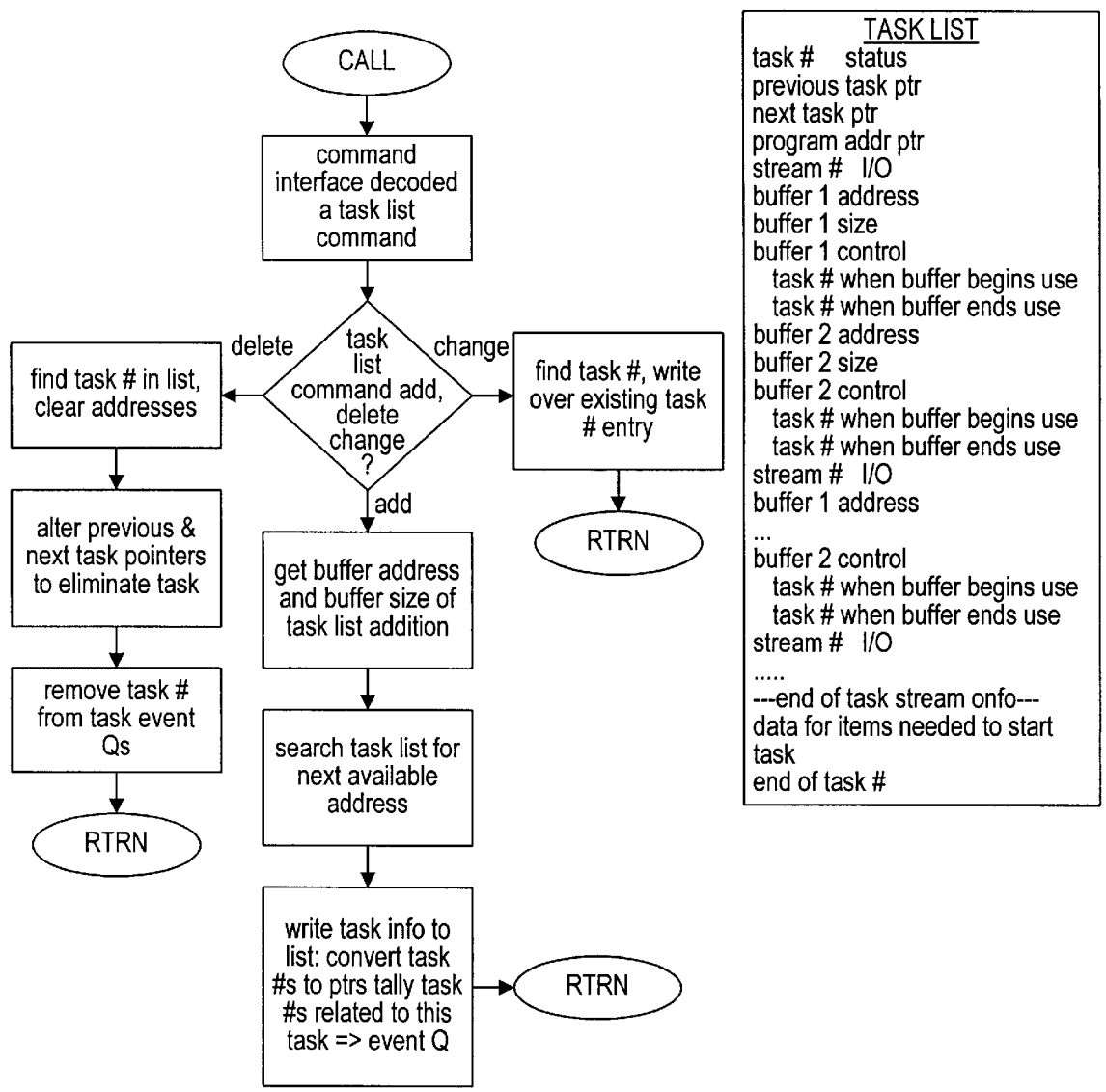
FIG. 23 shows a flowchart of EXEC routine task program.
Figure 24:
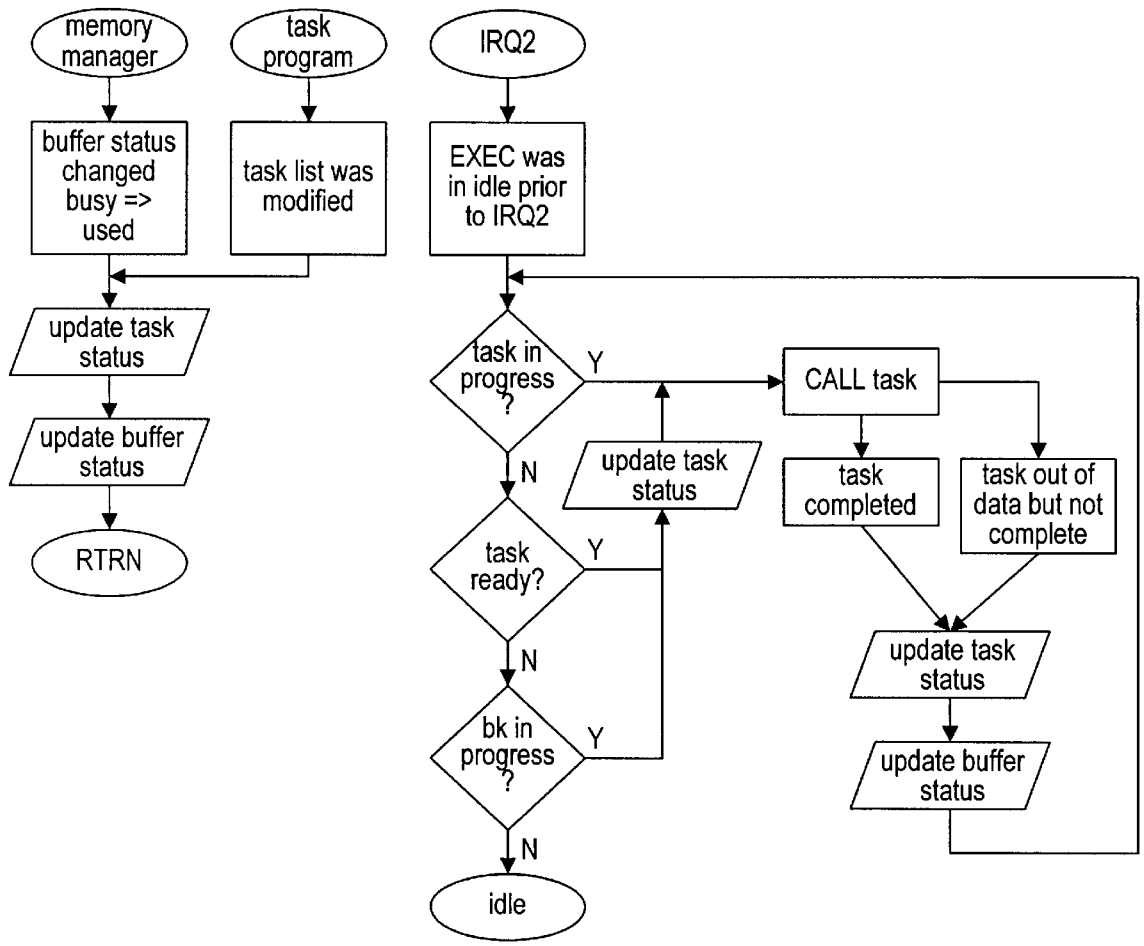
FIG. 24 shows a flowchart of EXEC routine task scheduler.
Figure 25:
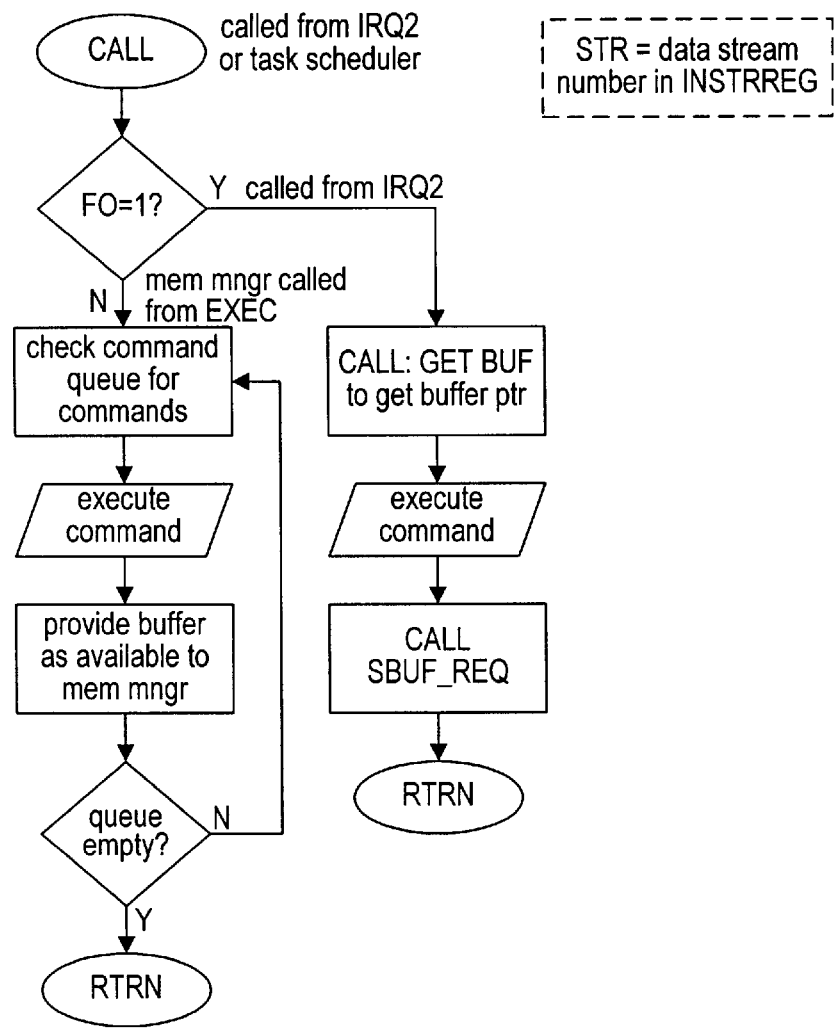
FIG. 25 shows a flowchart of the EXEC routine command interface.

The flow chart in FIG. 22 refers to the data stream buffers in DSP memory as available, busy, or used. Each buffer is passed between DFP 320, memory management routine, and task scheduler for transferring data. The meaning of each of the three terms depends on if a stream is sending data into or out of DSP 300.

Streams flowing out of DSP 300 have buffers made available to the memory manager by the task scheduler when the buffer is full of data. Buffers are busy after the buffer address and size has been given to DFP 320 for data stream packet transfers. The buffer stays busy until DFP 320 requests another buffer for that stream number, which means the previous one is completely read. At this point the buffer is used. The memory manager will give the buffer to the task scheduler.

Streams flowing into DSP 300 have buffers made available to the memory manager by the task scheduler when the buffer is empty. Buffers are busy after the buffer address and size has been given to DFP 320 for data stream packet transfers. The buffer stays busy until DFP 320 requests another buffer for that stream number, which means the previous one is completely written. At this point the buffer is used. The memory manager will give the buffer to the task scheduler.

In FIG. 22, the sub-routine BUF_REQ is used to provide a buffer to DFP 320 for a specific stream number, if one is available. The sub-routine SBUF_REQ is used to provide the next available buffer to DFP 320 from any stream number. The memory manager will keep a pointer to the BUFFER QUEUE and search again from that stream number on the next call of SBUF REQ. The sub-routine GET_BUF returns the address and size to a variable for a given stream number that DFP 320 has just completed using.

DSP Exec—Task Program Subroutine
Task Program

The TASK LIST is a buffer used by the TASK SCHEDULER to maintain the status of all the programmed tasks and scheduling parameters. The TASK LIST is built and maintained by the TASK_PROG routine. The task list is parsed often when the EXEC runs and contains direct pointers for efficiency. The TASK_PROG routine is used to interpret task numbers and order as programmed by MCU 310 into a table for the task scheduler to access.

The task list contains functional information on task order and related data stream numbers and buffer addresses. The TASK LIST is referenced whenever the TASK SCHEDULER runs. For each task programmed there can be many streams associated with the task. These would be used for signal processing data buffers as well as control oriented data passed between functions. For example an algorithm could be initiated by the TASK SCHEDULER when the input data is available and the timer count reaches a programmed value. One buffer would be used to write the input data and a second 1 word buffer for receipt of a word written by DFP 320 from the timer. Each data stream can have one or two buffers associated with it. If only one is used the second is written to 0. A control word is associated with each buffer in the task list. Two task numbers are needed in the control word to determine when the buffer is made available to the memory manager and a task number to determine when to leave the buffer status as used. This does two things, it allows DFP 320 and memory manager to work more efficiently by only processing buffers and data for streams that are being used. It also allows DSP data memory reuse.

At the end of the entry for each task data will be written to list the items that gate the starting of the task. These would typically include stream buffer status and the status of another task(s) (completed, in progress).

DSP Exec—Task Scheduler Subroutine
Task Scheduler

The TASK SCHEDULER will update the status of the tasks and move between tasks according to the items each task needs in order to begin. The status of tasks may change on:

Task status becoming 'completed'

The status of a task becoming 'ready to run'. (when tasks are run in parallel)

a command received directly by the TASK SCHEDULER a data buffer status changing from 'busy' to 'used'. This means an input buffer has become full, or an output buffer has been read.

the TASK PROGRAM sub-routine has run and modified the TASK LIST

DSP Exec—Command Interface Subroutine

The command interface routine is used to interpret data passed between MCU 310 and DSP 300. The list of functions would depend on the system implementation. Basically any information outside the task scheduling and data flow needs to be handled. These commands could be used to by MCU 310 to control specific algorithms, interrogate status, or program DSP registers.

I claim:

1. A method for configuring a communications system, the communications system comprising a data flow processor (DFP), a microcontroller (MCU) coupled to the DFP, a processing device coupled to the DFP, and a memory coupled to the DFP, the method comprising:

the MCU programming the DFP to perform data transfers;

the MCU generating a task list, wherein the task list comprises a plurality of tasks to be executed by the processing device;

the MCU transferring the task list to the DFP;

the DFP transferring the task list to the memory;

the memory receiving and storing the task list;

the processing device accessing the task list from the memory, wherein the processing device accessing the task list from the memory comprises:

the DFP interrupting the processing device in response to the DFP transferring the task list to the memory, wherein the interrupting alerts the processing device to the presence of the task list in the memory; and wherein the processing device accesses the task list from the memory in response to the interrupting;

the processing device executing the plurality of tasks in the task list to perform communication functions in the communications system;

the DFP performing the data transfers in response to the MCU programming the DFP, wherein the DFP performs the data transfers to facilitate the processing device executing the plurality of task lists.

2. The method of claim 1, further comprising the MCU performing higher level protocol tasks, wherein the MCU performs the higher-level protocol tasks in parallel with the DFP performing the data transfers and in parallel with the processing device executing the plurality of tasks in the task list.

3. The method of claim 1, further comprising the processing device programming the DFP to perform data transfers.

4. The method of claim 1, further comprising the MCU modifying the task list after the memory receiving and storing the task list.

5. The method of claim 1, wherein the processing device executing the plurality of tasks in the task list comprises the processing device distributing at least a portion of one or more of the plurality of tasks to one or more auxiliary processing devices through the DFP.

6. A method for configuring a communications system, the communications system comprising a data flow processor (DFP), a microcontroller (MCU) coupled to the DFP, a processing device coupled to the DFP, and a memory coupled to the DFP, the method comprising:

the MCU programming the DFP to perform data transfers;

the MCU generating a task list, wherein the task list comprises a plurality of tasks to be executed by the processing device;

the MCU transferring the task list to the DFP;

the DFP transferring the task list to the memory;

the memory receiving and storing the task list;

the processing device accessing the task list from the memory;

the processing device executing the plurality of tasks in the task list to perform communication functions in the communications system;

the DFP performing the data transfers in response to the MCU programming the DFP, wherein the DFP performs the data transfers to facilitate the processing device executing the plurality of task lists;

the DFP accessing a first address in the memory to perform data transfers between the memory and one of the processing devices, the MCU, and an additional processing device coupled to the DFP;

the processing device accessing a second address in the memory to perform data transfers between the memory and the processing device;

wherein the processing device accesses the second address simultaneously to the DFP accessing the first address in the memory and wherein the first address is different from the second address.

7. A method for configuring a communications system, the communications system comprising a data flow processor (DFP), a microcontroller (MCU) coupled to the DFP, a processing device coupled to the DFP, and a memory coupled to the DFP, the method comprising:

the MCU programming the DFP to perform data transfers;

the MCU generating a task list, wherein the task list comprises a plurality of tasks to be executed by the processing device;

the MCU transferring the task list to the DFP;

the DFP transferring the task list to the memory;

the memory receiving and storing the task list;

the processing device accessing the task list from the memory;

the processing device executing the plurality of tasks in the task list to perform communication functions in the communications system;

the DFP performing the data transfers in response to the MCU programming the DFP, wherein the DFP performs the data transfers to facilitate the processing device executing the plurality of task lists;

the DFP attempting to access a first address in the memory to perform data transfers between the memory and one of the processing devices, the MCU, and an additional processing device coupled to the DFP;

the processing device attempting to also access the first address in the memory to perform data transfers between the memory and the processing device simultaneously to the DFP accessing the first address in the memory;

wherein only the DFP accesses the first address and wherein the processing device accesses the first address after the DFP finishes accessing the first address.

8. A method for configuring a communications system, the communications system comprising a data flow processor (DFP), a microcontroller (MCU) coupled to the DFP, a processing device coupled to the DFP, and a memory coupled to the DFP, the method comprising:

the MCU programming the DFP to perform data transfers;

the MCU generating a task list, wherein the task list comprises a plurality of tasks to be executed by the processing device;

the MCU transferring the task list to the DFP;

the DFP transferring the task list to the memory;

the memory receiving and storing the task list;

the processing device accessing the task list from the memory;

the processing device executing the plurality of tasks in the task list to perform communication functions in the communications system;

the DFP performing the data transfers in response to the MCU programming the DFP, wherein the DFP performs the data transfers to facilitate the processing device executing the plurality of task lists;

the DFP attempting to access a first address in the memory to perform data transfers between the memory and one of the processing devices, the MCU, and an additional processing device coupled to the DFP;

the processing device attempting to also access the first address in the memory to perform data transfers between the memory and the processing device simultaneously to the DFP accessing the first address in the memory;

wherein only the processing device accesses the first address and wherein the DFP accesses the first address after the processing device finishes accessing the first address.

9. A method for configuring a communications system, the communications system comprising a data flow processor (DFP), a microcontroller (MCU) coupled to the DFP, a processing device coupled to the DFP, and a memory coupled to the DFP, the method comprising:

the MCU programming the DFP to perform data transfers, wherein the MCU programming the DFP to perform data transfers comprises:

the MCU programming the DFP to perform the data transfers in a plurality of data streams;

the MCU indicating to the DFP a source and destination address for each of the plurality of data streams;

the MCU indicating to the DFP a total amount of data to be transferred for each of the plurality of data streams;

the MCU indicating to the DFP a packet size, wherein the packet size is an amount of data to be transferred during each access of the source and destination addresses; and the MCU indicating to the DFP a device to be interrupted when the DFP completes the total amount to be transferred for the data stream;

the MCU generating a task list, wherein the task list comprises a plurality of tasks to be executed by the processing device;

the MCU transferring the task list to the DFP;

the DFP transferring the task list to the memory;

the memory receiving and storing the task list;

the processing device accessing the task list from the memory;

the processing device executing the plurality of tasks in the task list to perform communication functions in the communications system;

the DFP performing the data transfers in response to the MCU programming the DFP, wherein the DFP performs the data transfers to facilitate the processing device executing the plurality of task lists.

10. A method for configuring a communications system, the communications system comprising a data flow processor (DFP), a microcontroller (MCU) coupled to the DFP, a processing device coupled to the DFP, and a memory coupled to the DFP, the method comprising:

the MCU programming the DFP to perform data transfers;

the MCU generating a task list, wherein the task list comprises a plurality of tasks to be executed by the processing device;

the MCU transferring the task list to the DFP;

the DFP transferring the task list to the memory;

the memory receiving and storing the task list;

the processing device accessing the task list from the memory;

the processing device executing the plurality of tasks in the task list to perform communication functions in the communications system; and the DFP performing the data transfers in response to the MCU programming the DFP, wherein the DFP performs the data transfers to facilitate the processing device executing the plurality of task lists, wherein the DFP performing the data transfers comprises:

the DFP performing the data transfers in a plurality of data streams;

the DFP performing data transfer for a data stream when the DFP determines that a source address of the data stream has available data and when the DFP determines that a destination address of the data stream has available space for the data; and the DFP transferring data in packets between the source address and the destination address for each of the plurality of data streams.

11. The method of claim 10, wherein a device at the source address and a device at the destination address are operating at different clock rates.

12. The method of claim 10, wherein the DFP transferring data comprises the DFP comprising a source pointer which points to the source address and a destination pointer which points to the destination address and wherein, after transferring data, the source pointer is incremented and the destination pointer is incremented.

13. The method of claim 10, wherein the DFP performing the data transfers comprises: wherein the DFP transferring data comprises the DFP comprising a source pointer which points to the source address and a destination pointer which points to the destination address and wherein, after transferring data, the source pointer is incremented.

14. The method of claim 10, wherein the DFP transferring data comprises the DFP comprising a source pointer which points to the source address and a destination pointer which points to the destination address and wherein, after transferring data, the destination pointer is incremented.

15. The method of claim 10, further comprising the DFP interrupting one of the processing device, the MCU, or an additional processing device coupled to the DFP when a data stream is complete.

16. A method for configuring a communications system, the communications system comprising a data flow processor (DFP), a microcontroller (MCU) coupled to the DFP, a processing device coupled to the DFP, and a memory coupled to the DFP, the method comprising:

the MCU programming the DFP to perform data transfers;

the MCU generating a task list, wherein the task list comprises a plurality of tasks to be executed by the processing device;

the MCU transferring the task list to the DFP;

the DFP transferring the task list to the memory;

the memory receiving and storing the task list;

the processing device accessing the task list from the memory;

the processing device executing the plurality of tasks in the task list to perform communication functions in the communications system;

the DFP performing the data transfers in response to the MCU programming the DFP, wherein the DFP performs the data transfers to facilitate the processing device executing the plurality of task lists;

wherein the processing device executing the task list comprises:

the processing device allocating a buffer in the memory for the DFP to use for data transfers;

the processing device communicating to the DFP that a buffer in the memory is available for reading or writing;

wherein the DFP performs the data transfers in response to the processing device communicating to the DFP that the buffer in the memory is available for reading or writing;

wherein the DFP communicates to the processing device when the memory buffer is empty or full.

17. A method for configuring a communications system, the communications system comprising a data flow processor (DFP), a microcontroller (MCU) coupled to the DFP, a processing device coupled to the DFP, and a memory coupled to the DFP, the method comprising:

the MCU programming the DFP to perform data transfers;

the MCU generating a task list, wherein the task list comprises a plurality of tasks to be executed by the processing device;

the MCU transferring the task list to the DFP;

the DFP transferring the task list to the memory;

the memory receiving and storing the task list;

the processing device accessing the task list from the memory;

the processing device executing the plurality of tasks in the task list to perform communication functions in the communications system; and the DFP performing the data transfers in response to the MCU programming the DFP, wherein the DFP performs the data transfers to facilitate the processing device executing the plurality of task lists;

wherein the processing device executing the task list comprises:

the DFP determining a plurality of required data transfers in response to the MCU programming the DFP to perform the data transfers;

the DFP communicating to the processing device that a buffer in the memory is required for the data transfers; and the processing device communicating to the DFP that the buffer in the memory is available for reading or writing.

18. A method for configuring a communications system, the communications system comprising a data flow processor (DFP), a microcontroller (MCU) coupled to the DFP, a processing device coupled to the DFP, and a memory coupled to the DFP, the method comprising:

the MCU programming the DFP to perform data transfers;

the MCU generating a task list, wherein the task list comprises a plurality of tasks to be executed by the processing device;

the MCU transferring the task list to the DFP;

the DFP transferring the task list to the memory;

the memory receiving and storing the task list;

the processing device accessing the task list from the memory;

the processing device executing the plurality of tasks in the task list to perform communication functions in the communications system;

the DFP performing the data transfers in response to the MCU programming the DFP, wherein the DFP performs the data transfers to facilitate the processing device executing the plurality of task lists;

programming one or more additional processing devices by transferring data to the one or more additional processing devices through the DFP;

transferring additional data to and from the one or more additional processing devices through the DFP;

wherein the one or more additional parallel devices execute in parallel with the processing device and with the MCU.

* * * * *